United States Patent [19]

Bernard et al.

[11] Patent Number: 5,717,596
[45] Date of Patent: Feb. 10, 1998

[54] METHOD AND SYSTEM FOR FRANKING, ACCOUNTING, AND BILLING OF MAIL SERVICES

[75] Inventors: Joel P. Bernard, Stamford, Conn.; Pierre Coupé, Mazingarbe, France; Jean Paul DeBuchy, Pont A Marcq, France; Didier LeDuc, Le Plessis Robinson, France; Pascal Rougeau, Landas, France; Ronald P. Sansone, Weston, Conn.; François Touchet, Parmain, France

[73] Assignee: Pitney Bowes Inc., Stamford, Conn.

[21] Appl. No.: 388,939

[22] Filed: Feb. 15, 1995

[51] Int. Cl.$^6$ ............................................. G07B 17/00
[52] U.S. Cl. .................................. 364/464.02; 364/406
[58] Field of Search ........................ 364/406, 464.02, 364/464.03

[56] References Cited

U.S. PATENT DOCUMENTS

| | | | |
|---|---|---|---|
| 4,511,793 | 4/1985 | Racanelli | 364/464.03 |
| 4,725,718 | 2/1988 | Sansone et al. | 235/495 |
| 4,743,747 | 5/1988 | Fougere et al. | 235/494 |
| 4,760,532 | 7/1988 | Sansone et al. | 364/464 |
| 4,812,994 | 3/1989 | Taylor et al. | 364/464.02 |
| 4,831,555 | 5/1989 | Sansone et al. | 364/519 |
| 4,853,864 | 8/1989 | Hart et al. | 364/464.02 |
| 4,853,865 | 8/1989 | Sansone et al. | 364/464.02 |
| 4,855,920 | 8/1989 | Sansone et al. | 364/464.02 |
| 4,908,770 | 3/1990 | Breault et al. | 364/464.02 |
| 4,914,606 | 4/1990 | Vermesse | 364/464.02 |
| 4,931,943 | 6/1990 | Vermesse | 364/464.02 |
| 4,941,091 | 7/1990 | Breault et al. | 364/406 |
| 4,949,272 | 8/1990 | Vanourek et al. | 364/464.02 |
| 4,958,291 | 9/1990 | Mamone et al. | 364/464.02 |
| 4,962,459 | 10/1990 | Mallozzi et al. | 364/464.02 |
| 5,019,991 | 5/1991 | Sansone et al. | 364/464.03 |
| 5,072,397 | 12/1991 | Barns-Slavin et al. | 364/464.02 |
| 5,117,364 | 5/1992 | Barns-Slavin et al. | 364/464.03 |
| 5,124,926 | 6/1992 | Barns-Slavin et al. | 364/464.03 |
| 5,308,932 | 5/1994 | Manduley et al. | 364/464.02 X |
| 5,322,977 | 6/1994 | Manduley et al. | 364/464.03 X |
| 5,324,893 | 6/1994 | Manduley et al. | 364/464.03 X |
| 5,337,246 | 8/1994 | Carroll et al. | 364/464.02 |
| 5,384,708 | 1/1995 | Collins et al. | 364/464.02 |
| 5,444,630 | 8/1995 | Dlugos | 364/464.02 |
| 5,490,077 | 2/1996 | Freytag | 364/464.02 |
| 5,535,126 | 7/1996 | Mourgues | 364/464.02 |
| 5,557,516 | 9/1996 | Hogan | 364/406 |

FOREIGN PATENT DOCUMENTS

| | | |
|---|---|---|
| 0493943A2 | 7/1992 | European Pat. Off. . |
| 0526140A2 | 2/1993 | European Pat. Off. . |
| 2665003 | 1/1992 | France . |

*Primary Examiner*—Edward R. Cosimano
*Attorney, Agent, or Firm*—Robert H. Whisker; Melvin J. Scolnick

[57] ABSTRACT

The invention is a method for franking, accounting, and billing of mail pieces and services. The method is based upon the ability of a data processing system to communicate with a postage meter through the use of a meter linking device. Additionally, an application program within the data processing system, in which a customer account can be established and/or altered, is initialized. Customer account data is then entered into the application. Once the customer account has been established or verified, a transaction is initiated. First, the mail pieces to be placed into the mail stream are weighed on a weighing scale. The weight is converted using an appropriate rate table so as to determine the amount of postage to be franked by the postage meter. The postage meter performs a franking of the mail piece and the system records the amount of postage applied; further, the system calculates any discounts or surcharges that are applicable to this customer's account. Both the value franked and the actual amount to be charged are posted to the customer account. Next, the system operator determines whether or not a service or a mail product is to be included in the transaction, and then enters a value in the appropriate field for the service or mail product. If the transaction data or values are incorrect, then a modification can be performed. Additionally, accounts can be corrected through several other methods which depend upon the timing and the extent of the correction required.

21 Claims, 25 Drawing Sheets

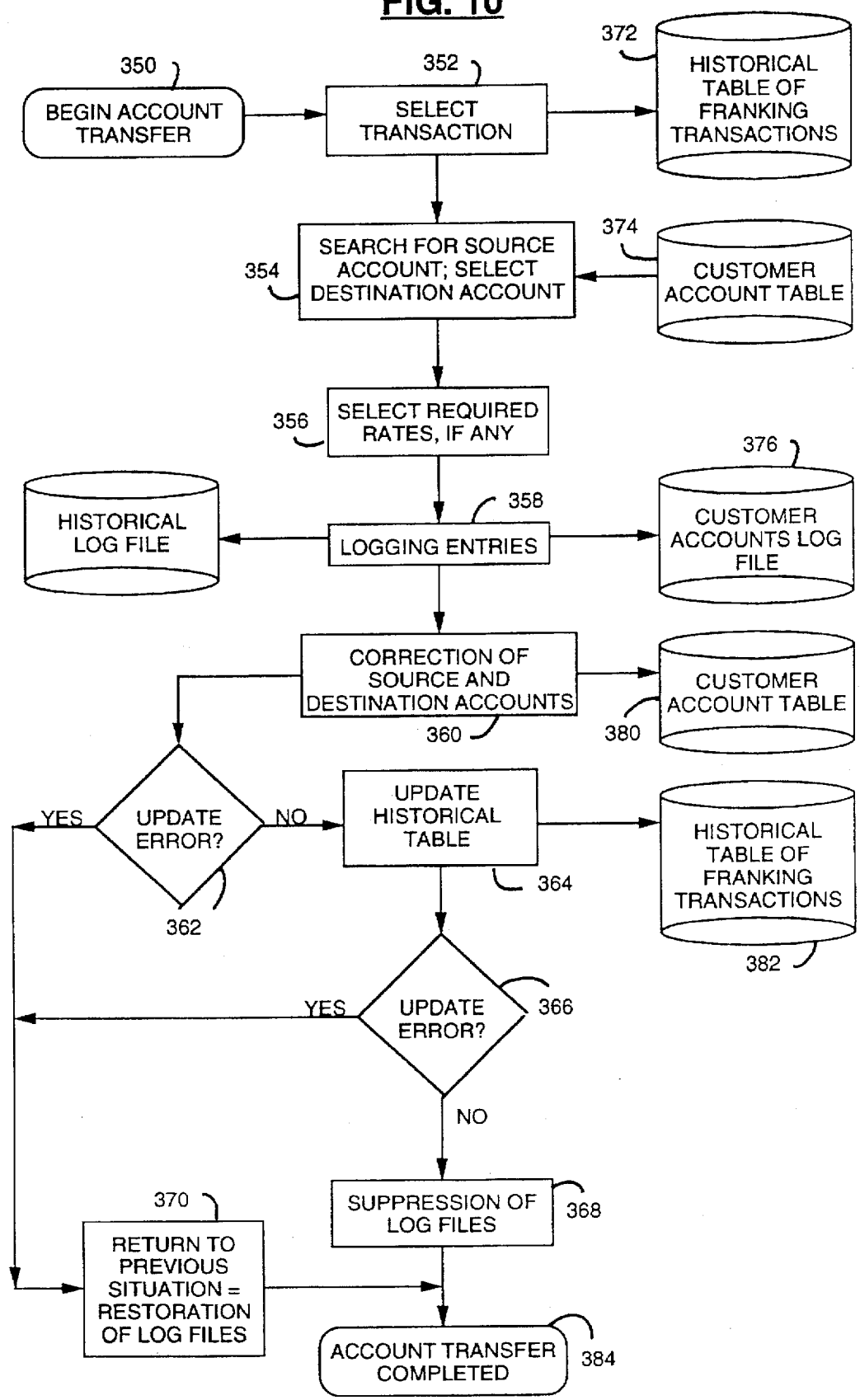

METHOD AND SYSTEM FOR FRANKING, ACCOUNTING, AND BILLING OF MAIL SERVICES

BACKGROUND OF THE INVENTION

The postage meter has undergone a steady evolution since its inception and practical reduction to practice in the 1920s. Postage meters are essentially mass produced devices for printing a defined unit value for governmental or private carrier delivery of parcels and envelopes. The term postage meter also includes other like devices which provide unit value printing such as a tax stamp meter. Postage meters include internal accounting devices or registers which account for postage value stored within the meter.

One particular concern in all systems that dispense postage, such as a postage meter, is that an accurate accounting be made of all postage dispensed. This accounting is required by law and, typically, is accomplished by well known accounting registers within the postage dispensing system. These registers may have the form of ascending and descending registers. Typically, the ascending register is incremented by a value representative of the total value of the postage dispensed. At any given time in the operation of the system, the values of the ascending and descending registers, added together, must reflect the total amount of postage provided to the meter. The ascending register will indicate the total postage provided by franking; and, the descending register will reflect the total postage remaining to be used. In order to provide an initial amount of postage funds to the system, the descending register is charged with a value amount which represents the amount of postage funds which can be dispensed, while the ascending register is set to a zero funds condition. Typically, if for any reason a component of the postage dispensing system becomes inoperative, the further dispensing of postage is prohibited until the entire system is made operable.

The accounting device accounts for both the recharging of the meter with additional postage value and the printing of postage by the meter printing mechanism. External independent accounting systems, if used, will be subrogated to the accounting devices or registers of the postage meter when accounting for the postage printed by the meter. Accordingly, postage meters must possess high reliability to avoid the loss of user or governmental funds.

Most recently, there has been a change from a completely mechanical meter device to meters that incorporate electronic components extensively. And, although there have been a number of changes, there are certain elements that remain constant. For example, the need for security is absolute. Another common factor in prior postage systems is the inclusion of a postage indicia which is normally placed or franked in the upper right hand corner of one surface of an envelope or package.

Although postage meters have performed satisfactorily in the past and continue to perform satisfactorily, with the advance of the electronics arts, postage systems that link the convenience of a postage meter with the advantages of mail accounting systems utilizing data processing devices to provide enhanced utility, have become more common. These systems are less expensive and more flexible while still providing the serviceability and security necessary in the postage meter art. One such system disclosed is a POSTAGE AND MAILING INFORMATION APPLYING SYSTEM; Ronald P. Sansone et al.; U.S. Pat. No. 4,725,718, issued Feb. 16, 1988 and assigned to the assignee of the present invention.

The evolution of mailing systems has resulted in the need for a mail management system which provides for the centralized control over one or more postage dispensing devices in such a way that the activity of the devices may be monitored and recorded by a host system. In this way, an accounting may be made of the activity of all of the postage dispensing devices which are coupled to the host. This centralized control leads to increased efficiencies and accounting reliability in the overall operation of a mailroom. As an example, in a large organization such as a corporation, the mailroom will typically perform mailing services for a variety of different clients, such as departments, within the organization. Individual clients may be the marketing department, the product department, the legal department and other diverse interorganization departments. In order that each department may be accurately charged for the services performed by the mailroom it is desirable to generate a report which allocates, on a department by department basis, the postage expenditure and the value of services performed by the mailroom which are related to mailing functions.

In other organizations, the mailroom may be a primary service provided by the organization; the organization typically processing and mailing material for a number of different clients. In this type of organization, it is essential that the postage dispensed and the services related to the dispensing of this postage be allocated on a client-by-client basis in order that each client may be correctly invoiced for the postage expended and the services rendered. Thus, it can be realized that in any type of organization having a mailroom, that it is important that the mailroom be capable of uniquely identifying each client so that each client may be correctly invoiced.

And, as has been previously discussed, it is also essential that the postage value of each piece of mail processed be accurately accounted for to prevent the fraudulent or the inadvertent dispensing of postage. Therefore, the underlying rule of thumb is that the postage meter is always right. Therefore, the mailing system which links the needs of the postal service with those of the customer is required.

Thus, one object of the present invention is to provide a mailing system that provides the convenience of a postage meter with the advantages of a postal accounting system.

SUMMARY OF THE INVENTION

According to the invention, the object is achieved and the disadvantages of the prior art are overcome by a method for franking, accounting, and billing of mail pieces and services. The method comprises a number of steps. The steps center upon the ability of a data processing system to communicate with a postage meter; the meter having a set of ascending and descending registers. Communication is controlled through the use of a meter linking device that interfaces in-line with the data processing system and the postage meter.

The method begins by initializing an application program within the data processing system, in which a customer account can be established and/or altered. Customer data is entered into the application and the system operator determines whether or not a particular customer will pay the transaction value "over the counter," or would prefer to be billed at the end of a predetermined time period.

Once the customer account has been established or verified, a transaction is initiated by entering additional data and/or values into a data field of the application. The additional data and/or values may come from several sources. These include, but are not limited to: keyboard entry by the system operator; weight as determined by a peripheral weighing scale; rates as stored within the system; and, values as calculated by the system.

The transaction is comprised of a number of steps. First, the mail pieces to be placed into the mail stream are weighed on a weighing scale. The weight is looked up on a rate table by the data processing system so as to determine the amount of postage to be franked by the postage meter. The postage meter performs a franking of the mail piece and the system records the amount of postage applied; further, the system calculates any discounts or surcharges that are applicable to this customer's account. Both the value franked and the actual amount to be charged are posted to the customer account. Next, the system operator determines whether or not a service or a mail product is to be included in the transaction, and then enters a value in the appropriate field for the service or mail product.

The transaction is completed by totaling the values of the particular transaction and then determining whether or not the transaction data or the transaction values need to be corrected. If the data and values are correct then the transaction is recorded in the data processing system's memory. If, however, the transaction data or values are incorrect, then the system operator can split the transaction between two accounts. To move monetary value to a second account, a modification may be required.

A modification occurs when monetary value is moved either from a first account to a house account, or from the house account to the first account. To perform a modification, the account to be modified must be determined; then, a value amount by which the account will be modified must be determined. Next, it must be determined whether the value is to be added or subtracted from the chosen account. The value is then moved from the customer's account to the house account if the value is to be subtracted from the first account. If the value is to be added to the customer's account, then the determined value is moved from the house account to the customer's account.

Additionally, accounts can be corrected through several other methods after data or values have been entered; the method used depends upon the timing and the extent of the correction. For instance, if the ascending and descending registers of a particular postage meter do not match a record of the registers maintained within the data processing system, then the system can perform a rectification process. Also of particular note, is the transfer process. Both rectification and transfer are further discussed hereinbelow.

Occasionally, it may be determined that the ascending and descending registers of the system's postage meter do not correlate with the ascending and descending registers as recorded by the data processing system. This can occur when the postage meter is taken out of the system and used off-line for a period of time before being placed back into the system. In that case, a rectification is performed by determining the value difference between the registers of the postage meter and the recorded registers of the data processing system. A customer account is selected and the value amount by which the account will be rectified is calculated. The value amount is based upon the value difference of the registers and any surcharge or discount corresponding to the chosen account. Then, the value amount is posted to the selected customer account.

A transfer, on the other hand, results from a determination that an entire transaction has been misapplied to a customer's account. If it is determined that the transaction has been misapplied, then the misapplied transaction is transferred to a second account. The value amount by which the data fields of the customer account will be changed are calculated; the value amount being based upon any surcharge or discount corresponding to the customer's account. A second value amount by which the data fields of the second account will be changed is calculated; this value amount also based upon any surcharge or discount corresponding to the second account. Finally, the calculated value amount and the calculated second value amount are automatically transferred to their respective accounts.

BRIEF DESCRIPTION OF THE DRAWINGS

FIG. 10 is a flow chart of the account transfer process within the method of FIG. 2.

DETAILED DESCRIPTION OF THE PREFERRED EMBODIMENTS

Figure 1:
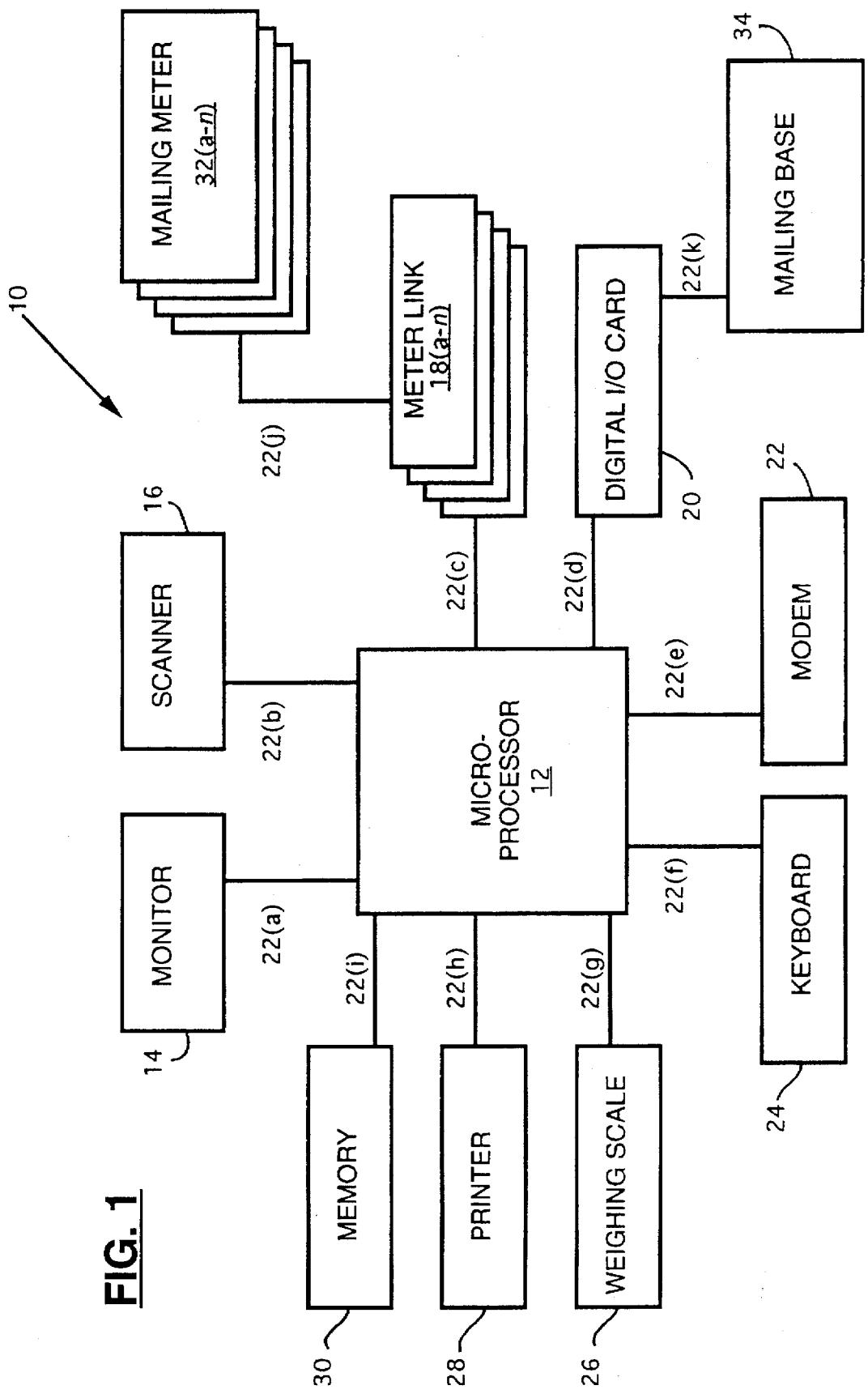
FIG. 1 is a block diagram of a mailing system which may incorporate the present invention.

Turning to FIG. 1, a system representative of a system that would employ the inventive method is mailing system 10, including: microprocessor 12 connected to monitor 14 by cable 22(a); scanner 16 connected to microprocessor 12 by cable 22(b); meter linking device 18(a–n) connected to microprocessor 12 by cable 22(c); digital input/output card 20 connected to microprocessor 12 by interface slot 22(d); modem 22 connected to microprocessor 12 by cable 22(e); keyboard 24 connected to microprocessor 12 by cable 22(f); weighing scale 26 connected to microprocessor 12 by cable 22(g); printer 28 connected to microprocessor 12 cable 22(h); memory 30 connected to microprocessor 12 by cable 22(i); postage meter 32(a–n) connected to meter linking device 18(a–n) by echoplex interface cable 22(j); and, mailing base 34 connected to digital input/output card 20 by cable 22(k).

Mailing base 34 is of a kind that can be remotely tripped by a mail piece passage; such bases are known and are developed and marketed by Pitney Bowes Inc. of Stamford, Conn., who is the assignee of the present invention.

Meter linking device 18 allows a host data processing system to remotely control postage meter 30, or known devices such as parcel registers, scales, or mailing machines. It should be noted that one or more postage meters 32 could be operatively connected to microprocessor 12; a corresponding meter linking device 18 would be utilized for each postage meter 32 that is so operatively connected. An example of a meter linking device is MeterLink which is developed and marketed by Pitney Bowes Inc. of Stamford, Conn., who is the assignee of the present disclosed invention. Typical applications which would employ a meter linking device are: postage or cost accounting; maintenance of transaction records; setting postage or other meter controls; adding funds to a meter; or, dispensing package tapes.

Mailing system 10 has the capability of performing a weekly back-up and restore of its data files so that in the event of a system failure, data can be restored. An individual day's data, which might otherwise be lost, can be restored from any of several mediums available which include: tape, diskette, upload from a backup system, upload from a senior level system; or upload from any of a plurality of memory devices to which mailing system 10 can download to.

Figure 2:
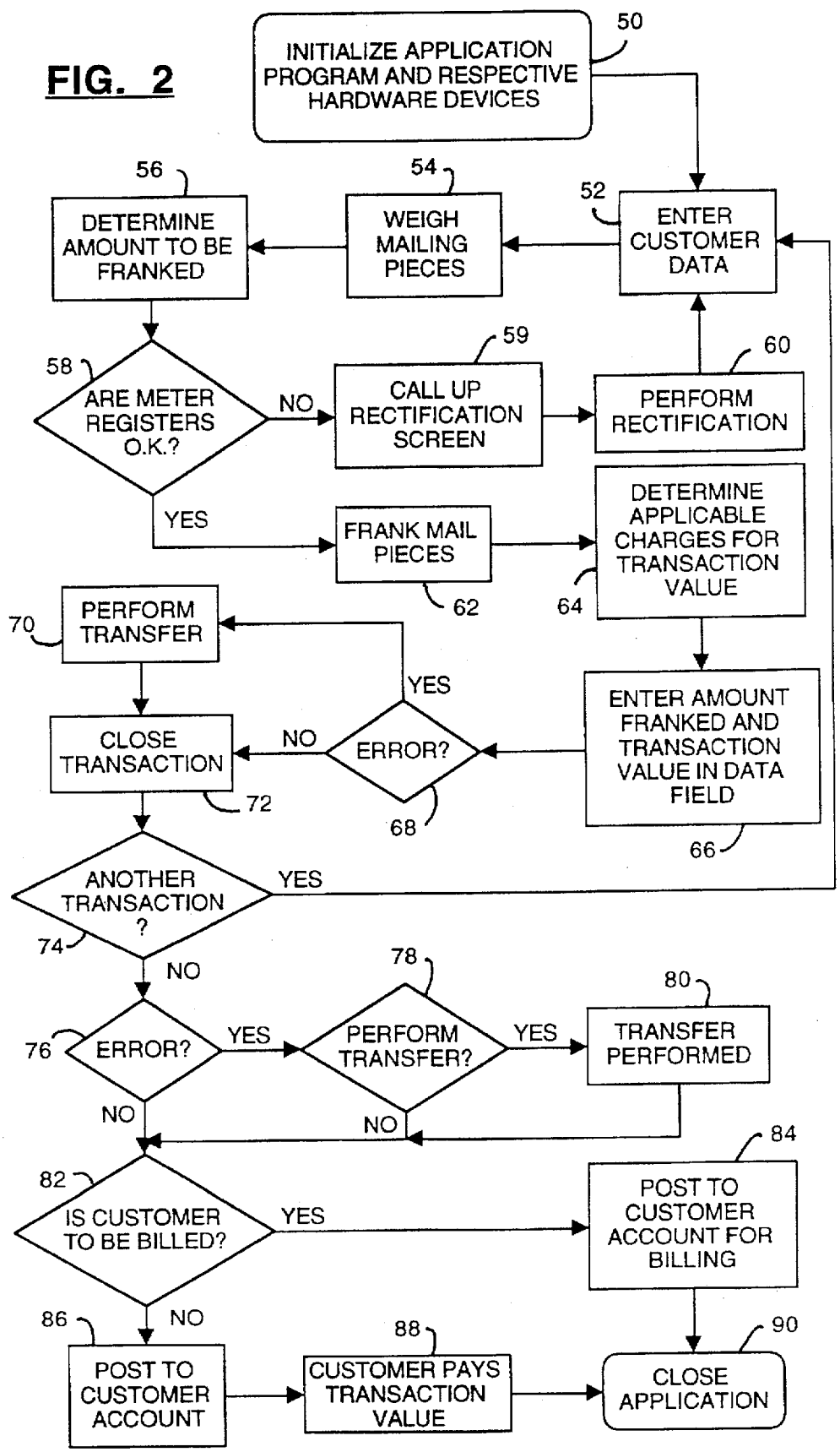
FIG. 2 is a high level flow chart of the method to be employed while utilizing the system of FIG. 1.

Turning to FIG. 2, at step 50 the application program of system 10 (the system) and the peripheral hardware devices are initialized by a system operator with a proper passcode. Passcode use is controlled in that a system manager can issue passcodes based on the level of access that is being allowed to the system. Customer data is entered at step 52; this data includes: the customer name; address; whether occasional or regular customer; a system code for the client; general information that may be required by the postal authority or mail services provider; and, any special rates, discounts, or surcharges which might apply to this client. When the customer data is entered, the system will assign any code required by the postal authority to identify that customer. The customer's mail pieces can then be weighed.

The mail pieces are individually weighed at step 54 and, based upon embedded rate tables, at step 56 the system determines an amount to be franked upon each mail piece. The system advances to step 58 where the system queries as to whether the ascending and descending registers of the meter, match the ascending and descending registers as recorded by the system. If the meter registers differ from the system registers, then the system calls up a rectification screen at step 59 and performs a rectification at step 60; otherwise the system advances to step 62. Meter registers might differ from system registers in the case where the meter was taken off-line and used apart from the system, and then the meter was later re-introduced to the system.

Figure 13:
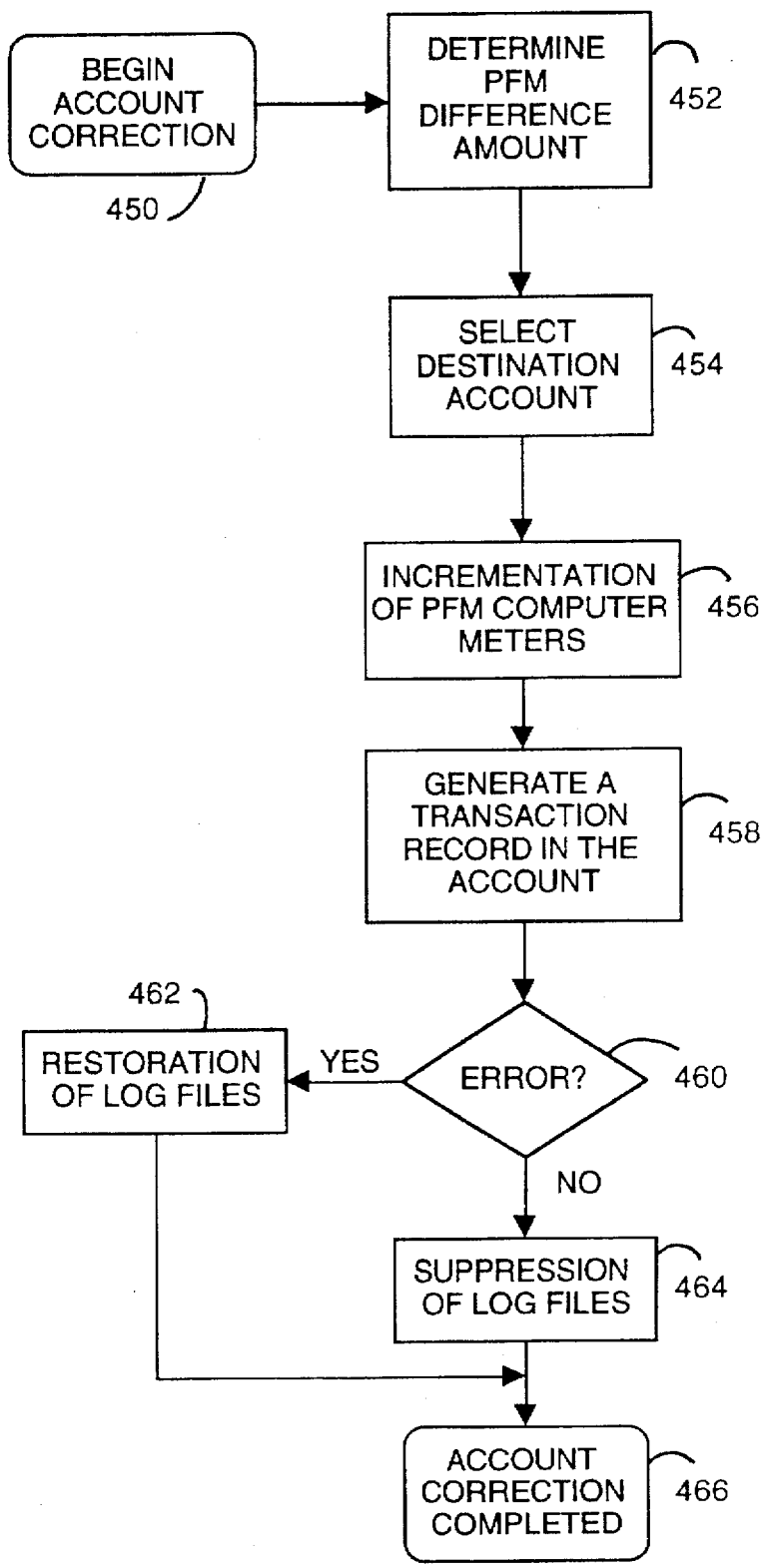
FIG. 13 is a flow chart of the rectification process within the method of FIG. 2.

A rectification consists of several steps; these are: determining that the ascending and descending registers of the postage meter do not correlate with the ascending and descending registers as recorded by the system; determining a value difference between the registers of the postage meter and the recorded registers of the system; selecting a customer account to be rectified; calculating a value amount by which the chosen account will be rectified, the value amount based upon the value difference and any surcharge or discount corresponding to the chosen account; and, posting the value amount to the selected customer account. After the rectification is completed at step 60, the system returns to step 52. A flowchart of the rectification process is shown in FIG. 13.

After the system has advanced to step 62, the individual mail pieces are franked by the postal franking meter with the value determined in step 56. At step 64, the system then determines any applicable service charges to be added to the customer account; the amount franked, plus any charges, are posted to the customer account and displayed in a data field at step 66. At step 68, the system will query as to whether or not there is an error in the displayed fields. If the response is "YES," then the system will perform a transfer at step 70; if the response to the query at step 68 is "NO," then the system will close the transaction at step 72.

A transfer consists of several steps; these are: determining whether or not the transaction has been misapplied to a particular customer account, and if the transaction has been misapplied, then; identifying the misapplied transaction; transferring the misapplied transaction to a second account; calculating a value amount by which the data fields of the customer account will be changed, the value amount based upon any surcharge or discount corresponding to that customer account; calculating a second value amount by which the data fields of the second account will be changed, the value amount based upon any surcharge or discount corresponding to that second account; and, automatically transferring the calculated value amount and the calculated second value amount to their respective accounts. After the transfer is completed at step 70, the system returns to step 72 where the system closes out the transaction before advancing to the query at step 74. At step 74, the system queries as to whether or not there are any additional transactions. If the response is "YES," then the system returns to step 52. If however, the response is "NO," then the system advances to step 76. A flowchart of the transfer process is shown in FIG. 10 where the system queries as to whether or not there are any additional transactions.

When the system has determined that there are no additional transactions at step 74, the system once again queries, at step 76, as to whether or not an error has been posted. The errors that are addressed by steps 68 and 76 refer to the posting of transaction data, in whole or in part to a wrong account; and, therefore can occur both before and after the closing of a transaction at step 72. If the response to 76 is "YES," then the system will query at step 78 as to whether or not a transfer is to be performed. If the response to the query at step 78 is "YES," then the system advances to step 80 and performs a transfer. If, however, the response at step 78 is "NO," then the system will advance to step 82.

After steps 78 and 80, or if the response to the query at step 74 were "NO," then the system advances to step 82. At step 82, the system queries as to whether or not the customer is to be billed. If the response to the query at step 82 is "YES," then the transaction is posted to the customer account at step 84 for future billing. If the response to the query at step 82 is "NO," then the transaction is posted to the client account at step 86 which causes a cash drawer to be opened so that the customer can pay the transaction value at step 88. Upon the closing of the cash drawer by the system operator, the system advances to step 90 and closes the application program.

Figure 3:
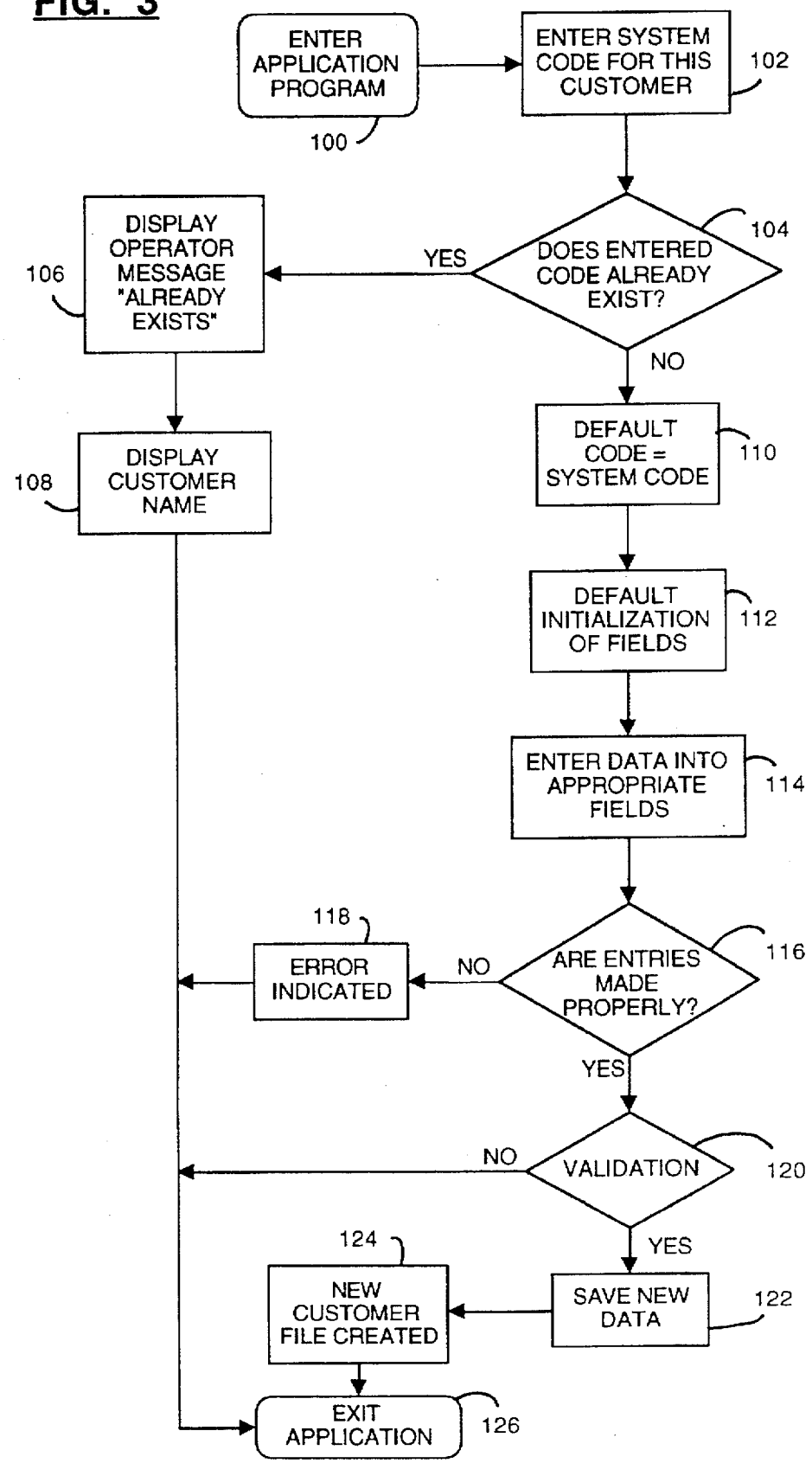
FIG. 3 is a flow chart of how a new client file is created within the method of FIG. 2.

Turning to FIG. 3, there is shown a process flow for the creation of a new client account. The system operator enters the application program at step 100 and enters a system code for the new customer at step 102. At step 104, the system queries its database to determine whether or not the code entered at step 102 already exists. If the response at step 104 is "YES," then the system advances to step 106 where the legend "ALREADY EXISTS" is displayed to the system operator. The system then advances to step 108, where the customer name is displayed. From step 108, the application is exited at step 126. If the response at step 104 is "NO," then the system sets a default code to equal the system code at step 110. A system code is assigned by the system operator at the time a customer initiates their first transaction. A code can also be assigned to a customer by the postal system or postal services provider. If the customer's account is, or is being, established, and the postal system or postal services provider has not yet established a code for the customer, then the system will assign a default code to the corresponding data field. At several points within the application, a customer code assigned by the postal service or mailing services provider can be input into the default field to identify that customer.

Once the default code is set at step 110, there is a default initialization of the data fields at step 112; this allows data to be entered into those fields at step 114. The system advances to step 116 where it queries as to whether the data entries were made properly. If the response is "YES," then system queries at step 120 as to whether there is a validation of the entries. If the response is "YES," then the system saves the new data at step 122, thus creating a new client file at step 124. The application is then exited at step 126.

If the response to the query at step 116 is "NO," then the system indicates to the system operator at step 118 that an error has occurred. The system then advances to step 126 and exits the application.

If the response to the query at step 120 is "NO," then the system advances to step 126 and exits the application.

Figure 4:
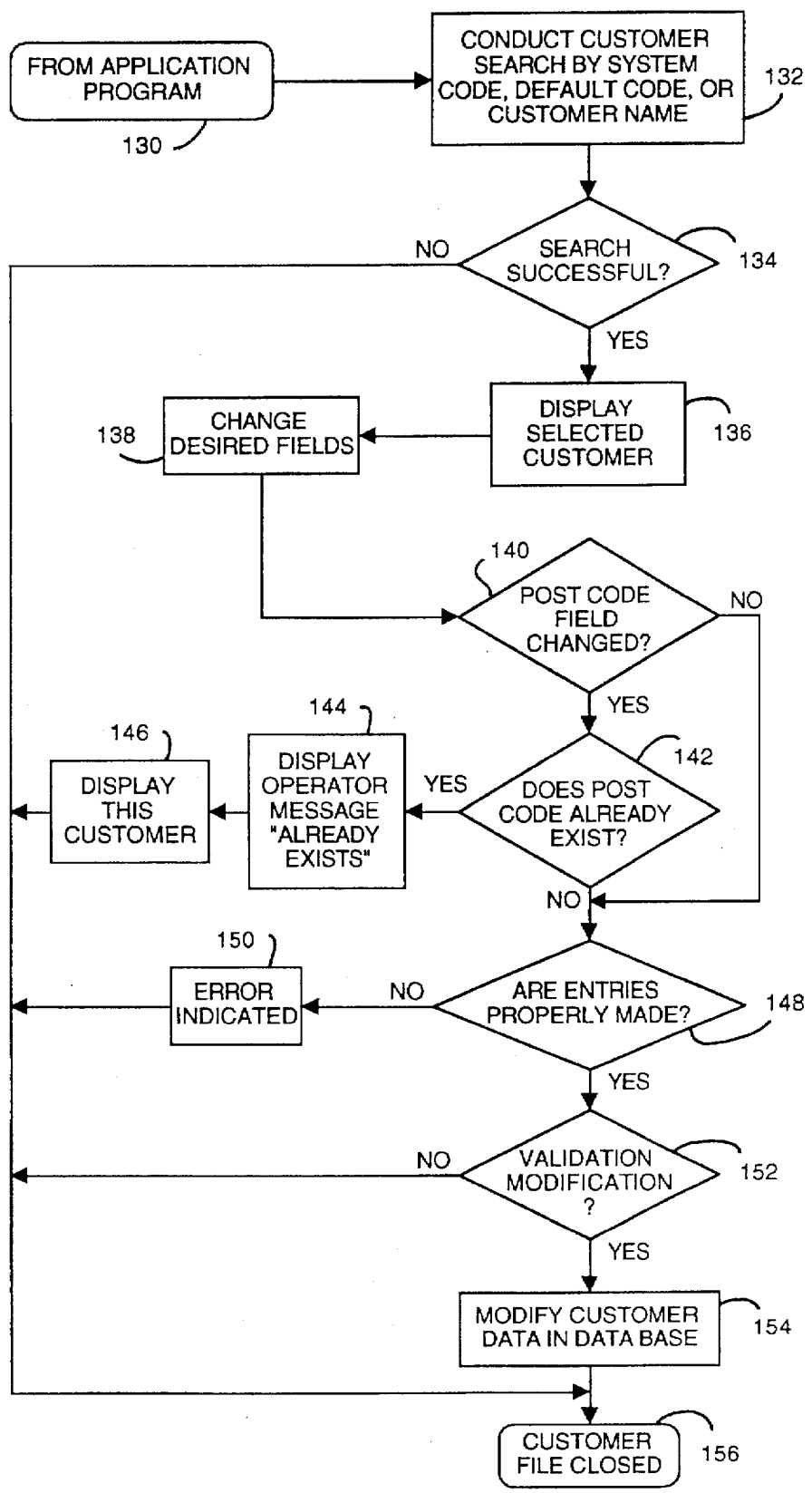
FIG. 4 is a flow chart of how a client file is corrected within the method of FIG. 2.

Turning to FIG. 4, there is shown a flowchart of the modification process. A modification consists of several steps; these are: first determining the account to be modified; determining a value amount by which the account will be modified; determining if the value amount is to be added or subtracted from the account; and then moving the determined value from the first account to a house account if the value is to be subtracted from the first account; and, moving the determined value from the house account to the first account if the value is to be added to the first account.

To conduct a modification, the system operator enters the application program at step 130 and begins, at step 132, a customer search by system code, default code or customer name. The customer search is described in detail in FIG. 5. At step 134, the system queries as to whether or not the customer search was successful. If the response to the query is "NO," then the system advances to step 156 where the customer file is closed and the program returns to the application menu. If, however, the response to the query at step 134 is "YES," then the system will display the selected customer at step 136 and allow the system operator to make changes to the desired data fields.

The system operator makes changes at step 138 and then the system advances to a series of queries beginning at step 140. At step 140, the system queries as to whether or not the postal code field has changed. The postal code is assigned by the postal service or mail services provider. If a code is issued, then the code would be placed in the proper field over the default code; however, if no code is being issued then the default code would remain in the field. If the response to the query at step 140 is "YES," then the system advances to step 142 and queries as to whether or not the selected post code already exists. If the response to the query at step 142 is "YES," then the system advances to step 144 where the legend ALREADY EXISTS is displayed for the system operator; the system displays the customer file for the pre-existing customer at step 146, then advances to step 156 where the customer file is closed and the program returns to the application menu.

If the response to the query at step 140, or at step 142, is "NO," then the system advances to step 148 where the system queries as to whether or not entries have been made properly. If the response is "NO," then system indicates an error at step 150 and advances to step 156 where the customer file is closed and the program returns to the application menu. If the response to the query is "YES," then the system queries at step 152 as to whether or not a modification of the customer data is required. If the response to the query is "NO," then the system advances to step 156; however, if the response to the query at step 152 is "YES," then the system allows the customer data to be modified before advancing to step 156 at step 156 where the customer file is closed and the program returns to the application menu.

Figure 5:
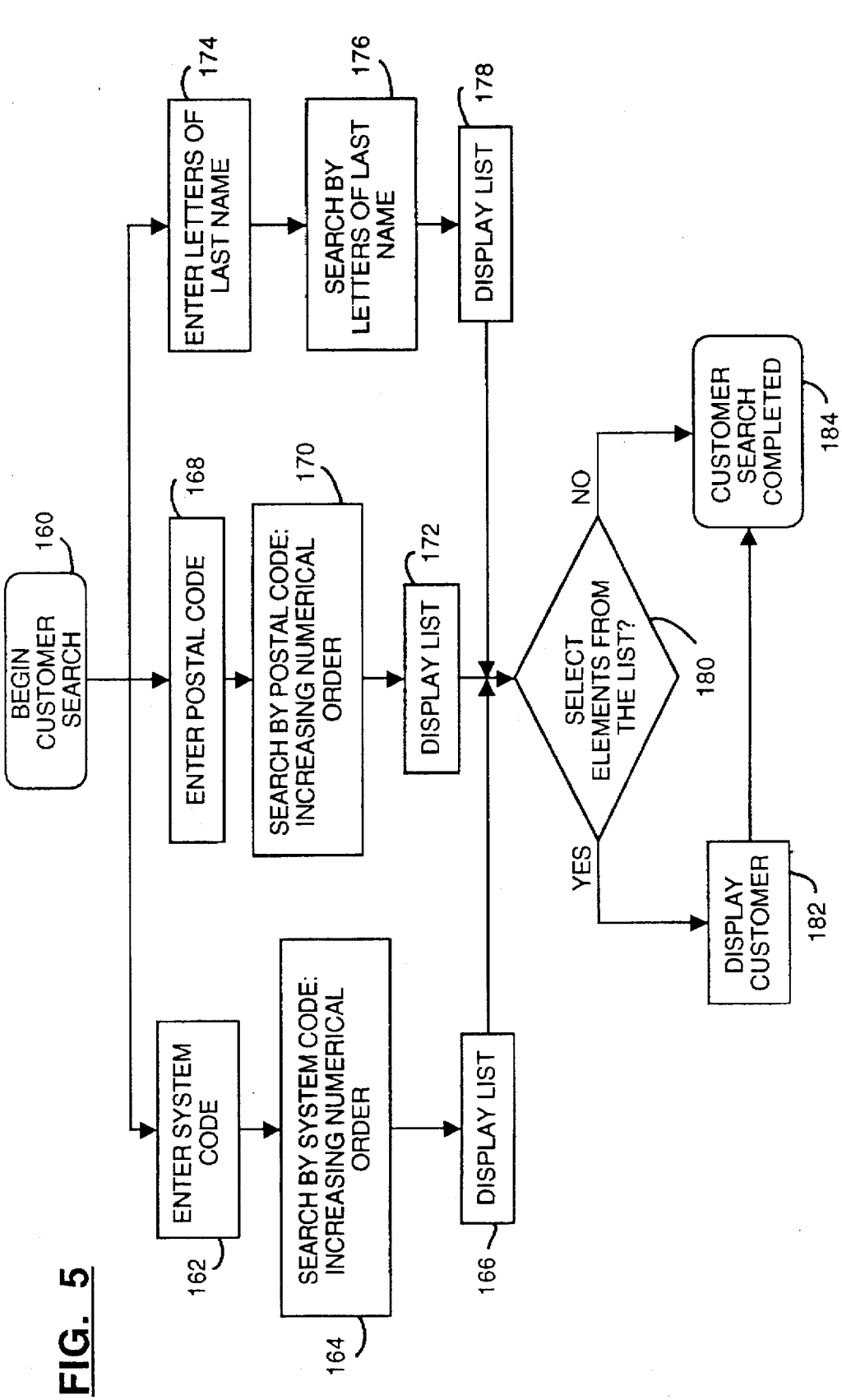
FIG. 5 is a flow chart of a client search and its possible selection paths within the method of FIG. 2.

Turning to FIG. 5, there is shown the steps required to conduct a customer search. The system operator begins the customer search at step 160 and has a choice of three paths dependent upon whether or not the system operator has entered a system code number, a postal code number, or the last name of the customer being sought.

If the system operator has entered the system code, then the operator enters the search at step 162. The system conducts the search by increasing numerical order at step 164 and then displays the customer list at step 166. The client list shows customer names, postal codes, and whether or not the customers are regular or occasional clients.

If the system operator has entered the postal code, then the operator enters the search at step 168. The system conducts the search by increasing numerical order at step 170 and then displays the customer list at step 172. The customer list shows customer names, postal codes, and whether or not the customers are regular or occasional clients.

If the system operator has entered the letters of the customer's last name, then the operator enters the search at step 174. The system conducts the search in alphabetical order at step 176 and then displays the customer list at step 178. The customer list shows customer names, postal codes, and whether or not the customers are regular or occasional clients.

The customer lists at steps 166, 172, and 178 each advance to step 180 where the system queries as to whether or not elements are to be selected from the displayed lists. If the system operator makes a selection, then the system advances to step 182 where the selected customer is displayed; then the system advances to step 184 where the customer search is completed. If the system operator did not make a selection at step 180, then the system advances to step 184 where the customer search is completed.

Figure 6:
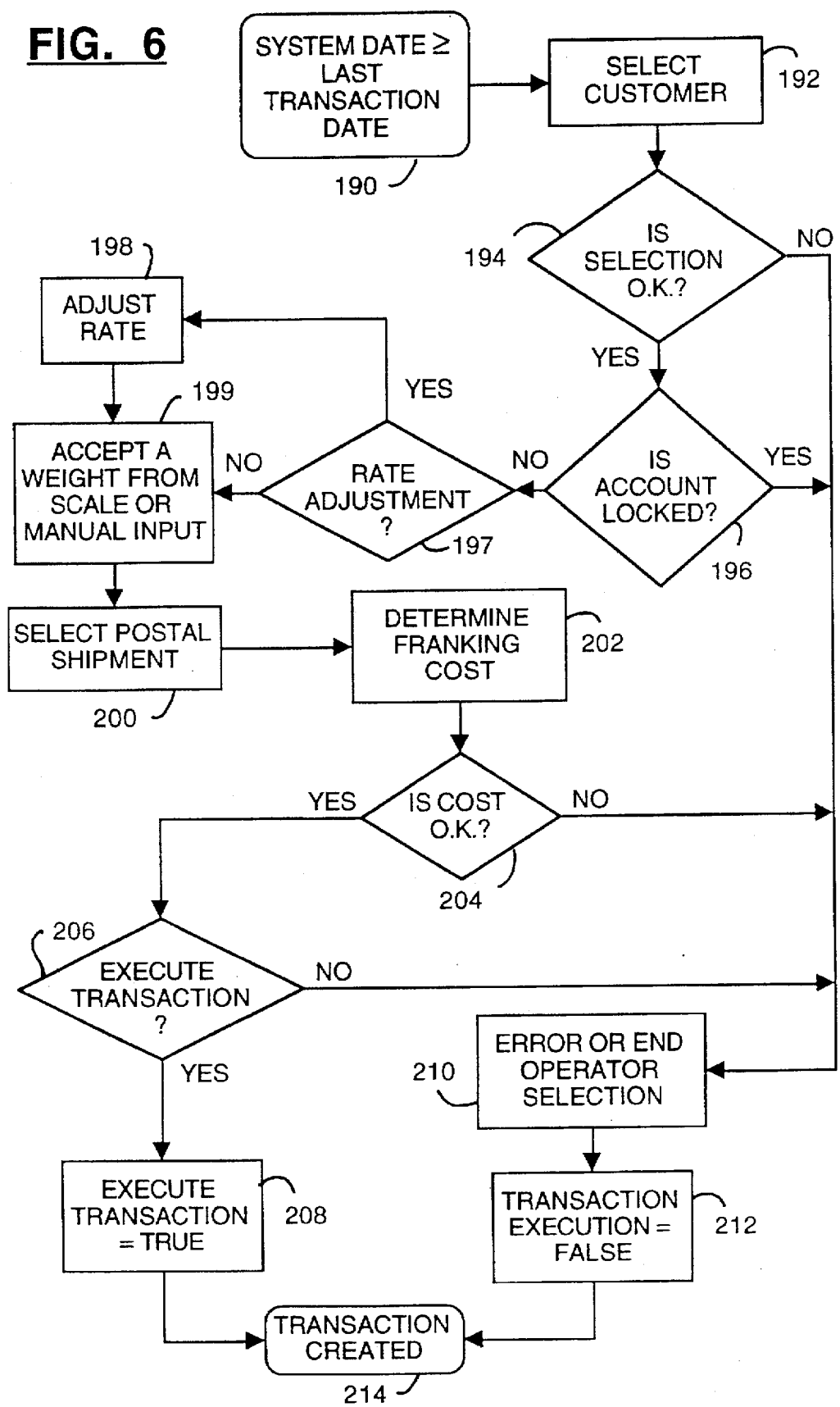
FIG. 6 is a flow chart of the creation of a transaction within the method of FIG. 2.

Turning to FIG. 6, the creation of a transaction is shown as starting with a date check at step 190. The purpose of checking the date is to make sure that the system was not reset or reconfigured.

After checking the date at step 190, the customer is selected at step 192. The system queries at step 194 as to whether the selection at step 192 is correct. If the response to the query at 194 is "NO," then the system advances to step 210 where an error or end of operator selection is recorded. If, however, the response to the query at step 194 is "YES," then the system queries at step 196 as to whether or not the account is locked. If the response is "YES," then the system advances to step 210 where an error or end of operator selection is recorded. If, however, the response to the query at step 196 is "NO," then the system, at step 197 queries as to whether or not a rate adjustment is required. If the response is "YES," then the system advances to step 198 where the rates are adjusted before advancing to step 199. If the response to the query at step 197 is "NO," then the system advances to step 199 where the system can accept a weight from weighing scale 24, or the system can accept a manual input.

With the acceptance of the weight at step 199, the system advances to step 200 and selects a postal shipment type by class or rate method. Based on the postal shipment type, the system determines the franking cost at step 202, and queries at step 204 as to whether the calculated cost is acceptable. It is possible to adjust transaction charges either up or down to reflect discounts, surcharges, or other charges. If the response to the query at step 204 is "NO," then the system advances to step 210 where an end of operator selection is recorded. If, however, the response to the query at step 204 is "YES," then the system queries at step 206 as to whether or not the system is prepared to execute the transaction. If the response to the query at step 206 is "NO," then the system advances to step 210 where an end of operator selection is recorded. If, however, the response to the query at step 206 is "YES," then the system advances to step 208 where transaction execution is set to true and the transaction is created at step 214. Creation of the transaction prepares the system for execution of the transaction. A transaction is executed in accordance with the steps to be found in FIG. 7.

If the response at steps 194, 196, 204, and 206 led to step 210, then the system would set the transaction execution to equal false at step 212 and the non-transaction would be complete at step 214.

Figure 7:
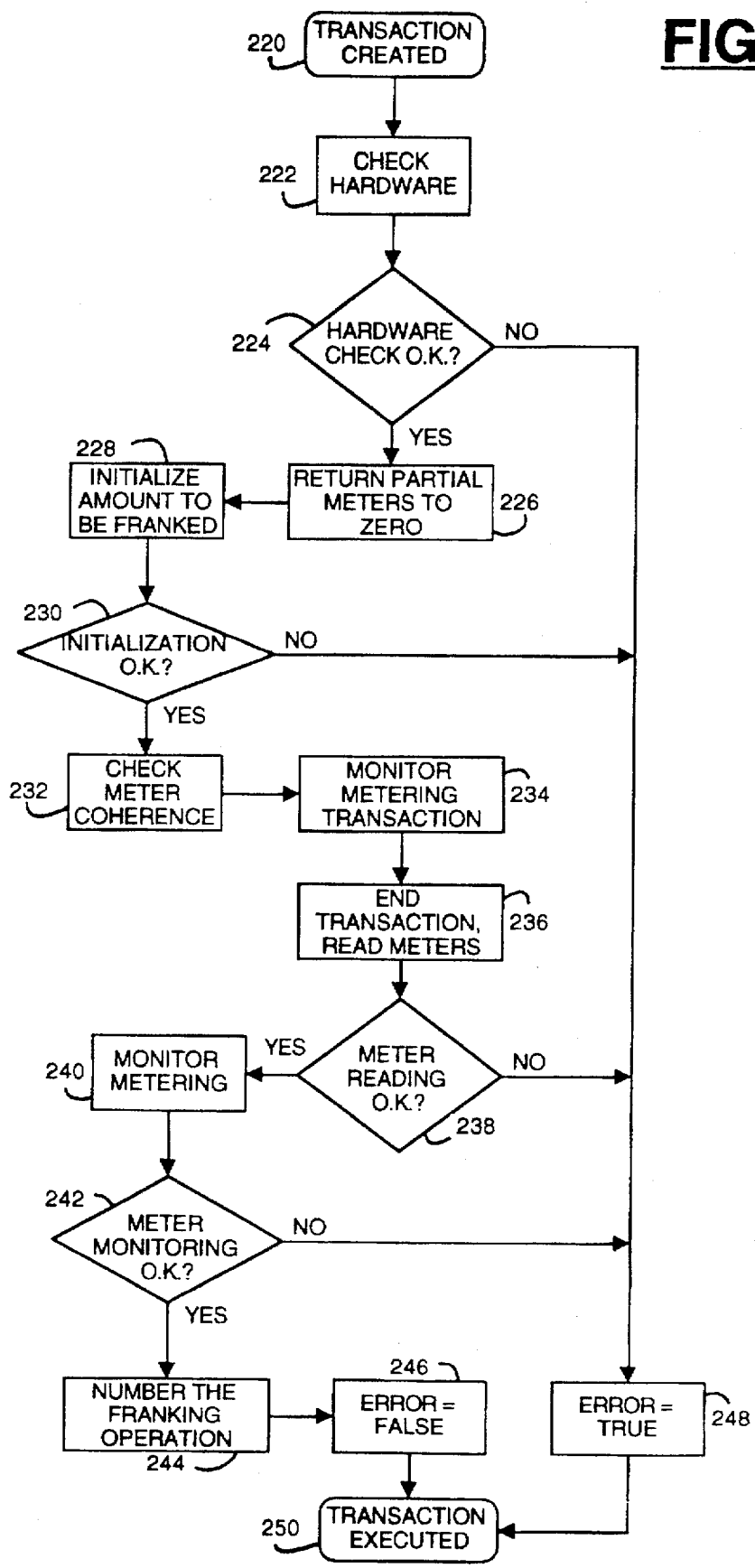
FIG. 7 is a flow chart of the execution of a transaction within the method of FIG. 2.

Turning to FIG. 7, the execution of the transaction created through the steps of FIG. 6 is shown. The transaction is created at step 220 and the system conducts a hardware check at step 222. The hardware check is performed to ensure that all hardware necessary to complete a given transaction is on-line and available. At step 224, the system queries as to whether or not the hardware check is O.K. If the response is "NO," then the system sets error equal to true at step 248 and advances to step 250 where the transaction is executed as an error. If, however, the response to the query at step 224 is "YES," then the system returns any partial meter settings to zero (RAZ=return to zero) at step 226 and initializes the amount to be franked at step 228.

From step 228, the system advances to step 230 and queries as to whether the initialization of the amount to be franked was O.K. If the response to the query at step 230 is "NO," then the system advances to step 248 and sets error equal to true; the system then advances to step 250 where the transaction is executed as an error. If, however, the response to the query at step 230 is "YES," then the system checks the meter coherence at step 232. Meter coherence refers to the interface between postal franking meter 32 and system 10 just after initialization and just prior to actual franking. When meter coherence is set, at step 234, the system will set the value on postal franking meter 32 and lock the keyboard of postal franking meter 32; the system will then frank the mail piece and monitor the process while it occurs. The franking transaction concludes at step 236 and the system reads the meter for an indication that meter register recorded the transaction. The system queries at step 238 as to whether the meter reading was O.K. If the response to the query is "NO," then the system moves to step 248 where an error is recorded as a true event. If, however, the response is "YES," then the system monitors the meter at step 240 and queries at step 242 as to whether the monitoring were successful. If the response to the query is "NO," then the system moves to step 248 where an error is recorded as a true event. If, however, the response is "YES," then the system numbers the franking operation for the system journal at step 244; and, indicates that an error is recorded as a false event at step 246.

From step 246, or from step 248, the system advances to step 250 were the transaction is concluded and recorded as executed. The recording of entries to the database, or the closing out of transactions, are shown in FIG. 8.

Figure 8:
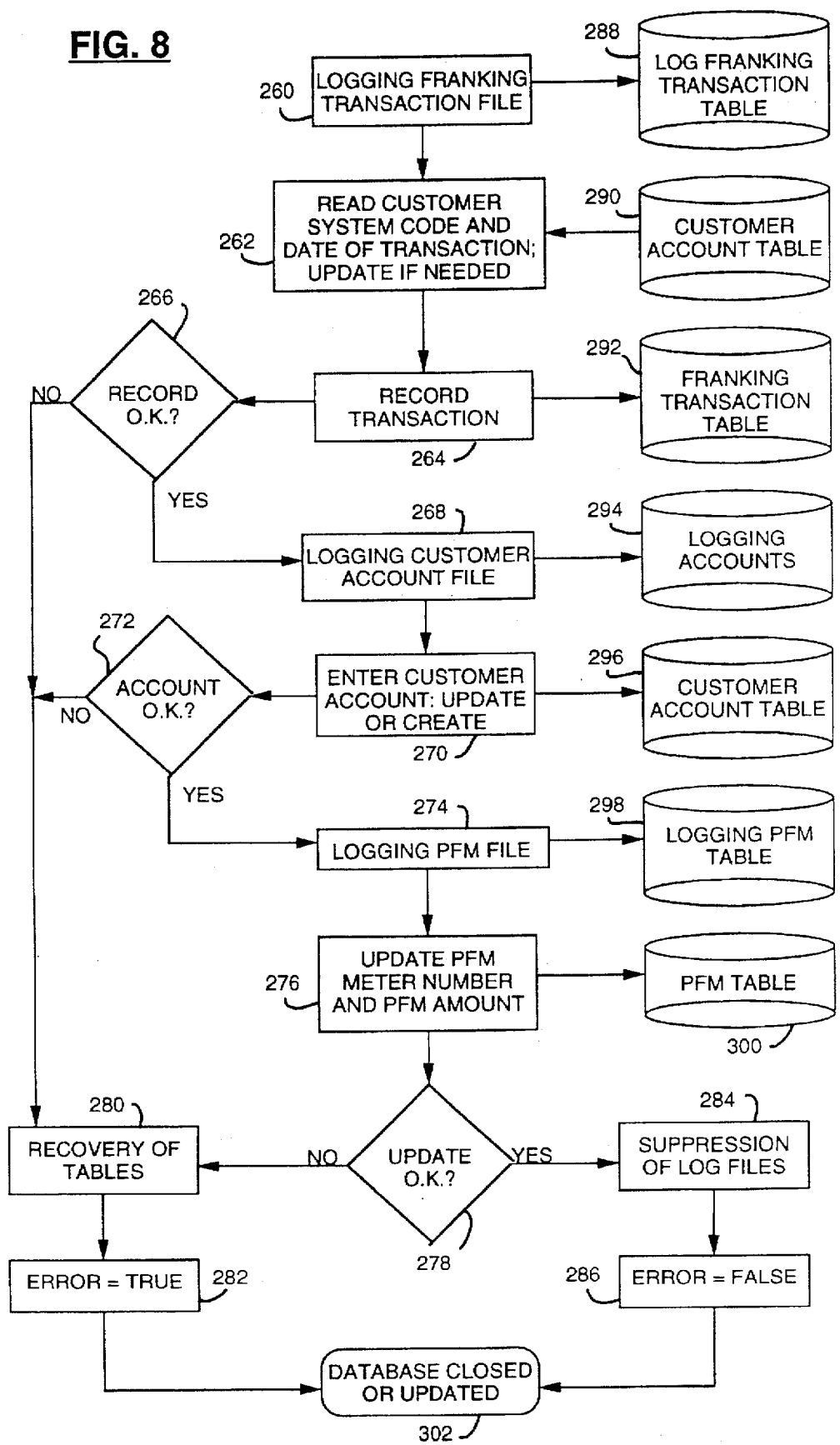
FIG. 8 is a flow chart of how data derived from a franking transaction is logged.

Turning to FIG. 8, the system logs the franking transaction file at step 260 and stores the file in the franking transaction table at step 288. From step 260, the system reads the client system code number and the date of the transaction at step 262 from the customer account table at step 290; if needed, the code and date can be updated at this step. The system advances to step 264 where the transaction is recorded in the franking transaction table at step 292. From step 264, the system queries the record transaction to determine whether or not the transaction recordation is O.K. If the response to the query is "NO," then the system advances to step 280 where the tables are recovered and re-established. If, however, the response to the query at step 266 is "YES," then the system logs the customer account file at step 268, and stores to the database at step 294.

When the customer account file has been logged, it is then possible to enter the customer account, at step 270, to update or create the customer account. Entries will be updated to the customer account table at step 296. When the appropriate entries have been made, the system queries at step 272 as to whether or not the account and its corresponding entries is accurate. If the response is "NO," then the system advances to step 280 where the tables are recovered and re-established. If, however, the response to the query at step 272 is "YES," then the system logs on the postal franking meter (PFM) file at step 274 and opens the corresponding table at step 298. The system advances to step 276 where the system's internal registers update the postal franking meter's number and the franked amount. The updated amounts are stored in the PFM table, at step 300, according to meter number. Once the update is stored, the system queries, at step 278, as to whether the update is accurate. If the response is "NO," then the system advances to step 280 where the tables are recovered and re-established. If, however, the response to the query at step 272 is "YES," then the system moves to step 284 where the log files are updated; error is set to false at step 286; and, the database is closed or updated at step 302. From step 280, error is set to true at step 282 and then the database is closed at step 302.

Figure 9:
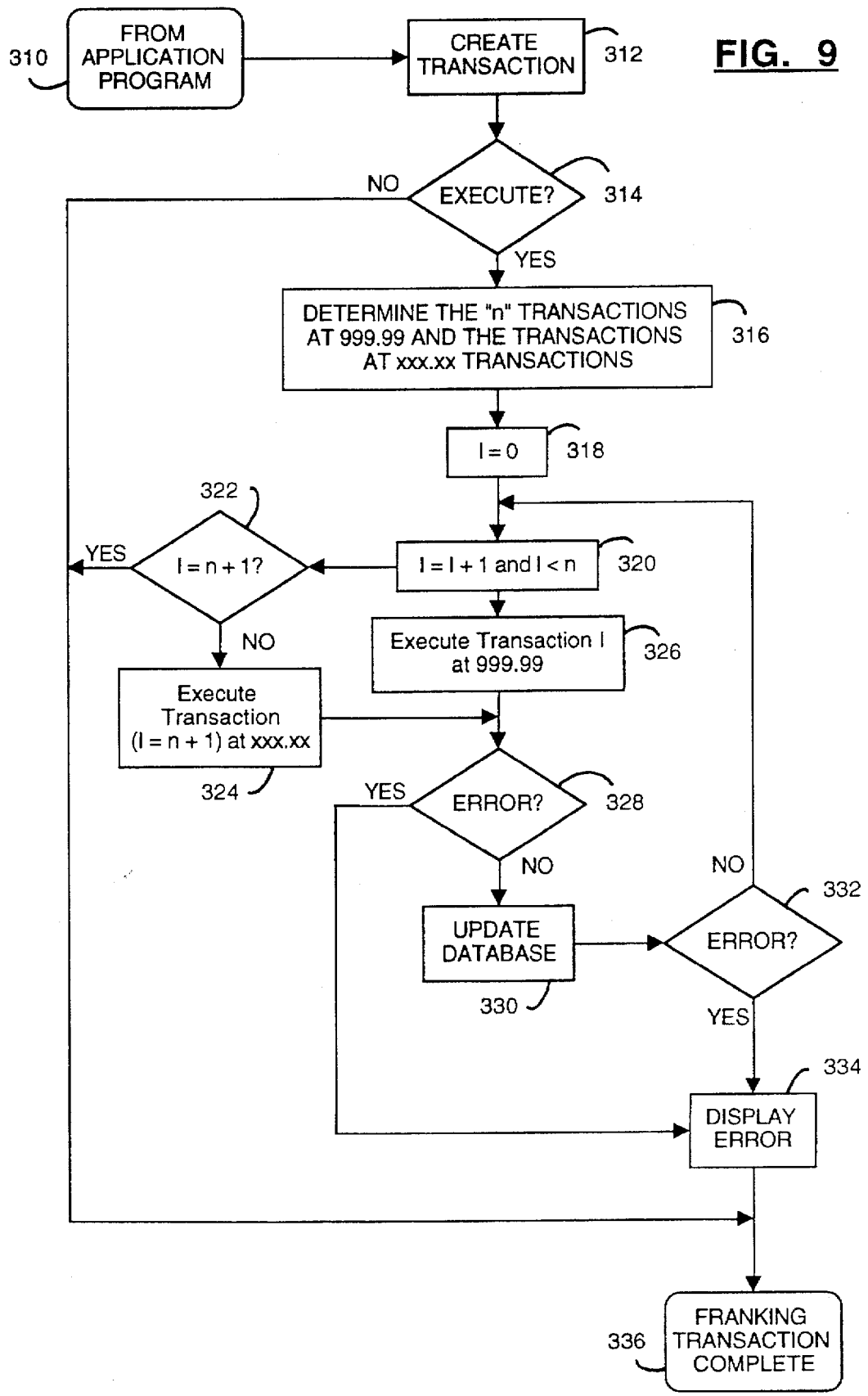
FIG. 9 is a flow chart of the franking management module that executes transactions in accordance with the capability of the franking head.

Turning to FIG. 9, the steps of the franking process are shown. From the application program at step 310, a transaction is then created at step 312. The system queries at step 314 as to whether or not the transaction created at step 312 should be executed. If the response to the query is "NO,"

then the system advances to step 336 where the franking transaction is completed. If, however, the response to the query is "YES," then the system advances to step 316.

The postal franking meter has a print head that has an upper print field limit of 999.99 when recording a transaction value. If the franking transaction exceeds the 999.99 limit, then the system determines at step 316 the "n" transactions that will take place at the maximum limit of 999.99 and then calculates the transactions that will be recorded at some value less than 999.99; where "n" represents the number of transactions. Values less than 999.99 are represented in the calculations as xxx.xx. It is possible to utilize a print head that has an upper print field limit of 99.999.

The number of transactions is determined by setting I equal to zero (I=0) at step 318, then advancing to step 320 where incrementation of the transactions is calculated by setting I=I+1 and 1<n. From step 320, there are two paths. The first path is to step 326 where transaction I is executed at 999.99; the second path is concerned with the xxx.xx transaction is implemented when the system advances to step 322 where the query "Does I=n+1?" is posed. If the response to the query is "YES," then the system advances to step 336 where the franking transaction is completed. If the response to the query at step 322 is "NO," then at step 324, the system executes the transaction where I=n+1 at xxx.xx. Both steps 326 and 324 advance to step 328 where the system queries as to whether or not an error has occurred. If the response to the query is "YES," then the system advances to step 334 and displays an error to the system operator before completing the franking transaction at step 336. If the response to the query at step, however, is "NO," then the database will be updated at step 330. After the database update, the system queries at step 332 as to whether or not an error is indicated while updating the database. If the response to the query is "YES," then an error is displayed to the system operator before completing the franking transaction at step 336. If the response is "NO," then system re-enters the path in front of step 320 and the cycle is re-run until the query at step 322 is responded to with a "YES."

Turning to FIG. 10, the steps required to complete a transfer of account data are shown. The transfer is begun at step 350 and then a transaction is selected at step 352 from the historical table of franking transactions at step 372. A search is conducted at step 354 to determine a source account and a destination account for the transfer. The search is conducted by utilizing the customer account table at step 374.

From step 354, the system advances to step 356 where any applicable rates are selected for the source and destination accounts. Advancing to step 358, the entries are logged to historical log file at step 378, and to the client accounts log file at step 376. When the entries are made at step 358, the system advances to step 360 where the source and destination accounts are corrected and adjusted for rates applicable to the particular account parameters. Once the corrections are entered into the customer account table at step 380, the system inquires as to whether or not there has been an update error. If the response to the query is "YES," then the system advances to step 370 where the log files and accounts are returned to their situation previous to the attempt to make a transfer; the account transfer is then considered complete at step 384. If the response to the query at step 362 is "NO," then the system updates, at step 364, the historical table at step 382. The system then queries at step 366 as to whether or not an error occurred during the update. If the response to the query is "YES," then the system advances to step 370 where the log files and accounts are returned to their situation previous to the attempt to make a transfer. If the response to the query at step 366 is "NO," then the log files are adjusted at step 368 and the account transfer is completed at step 384.

Figure 11A:
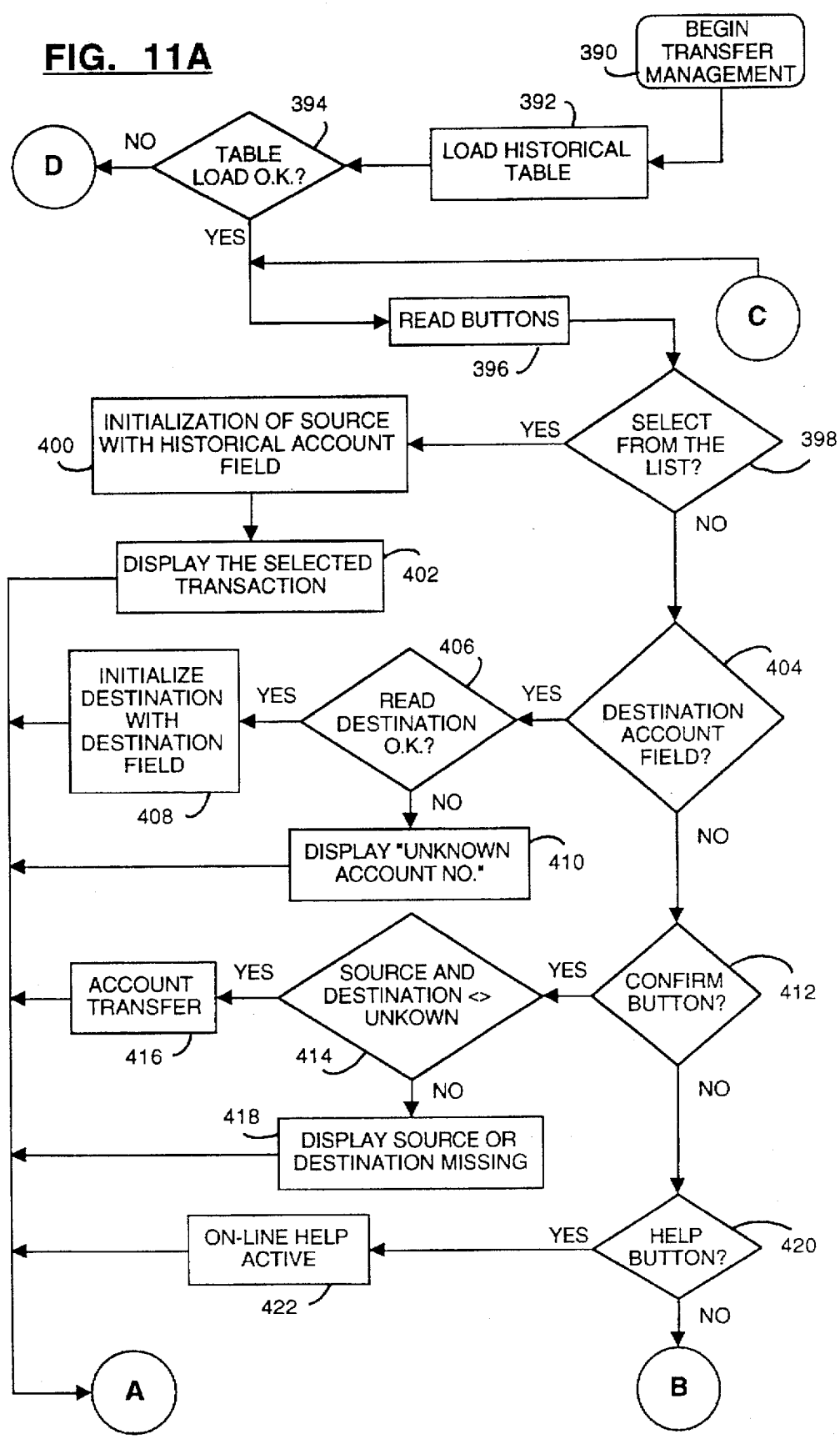
FIG. 11A and FIG. 11B are flow charts of the management of the display for the transfer process.
Figure 11B:
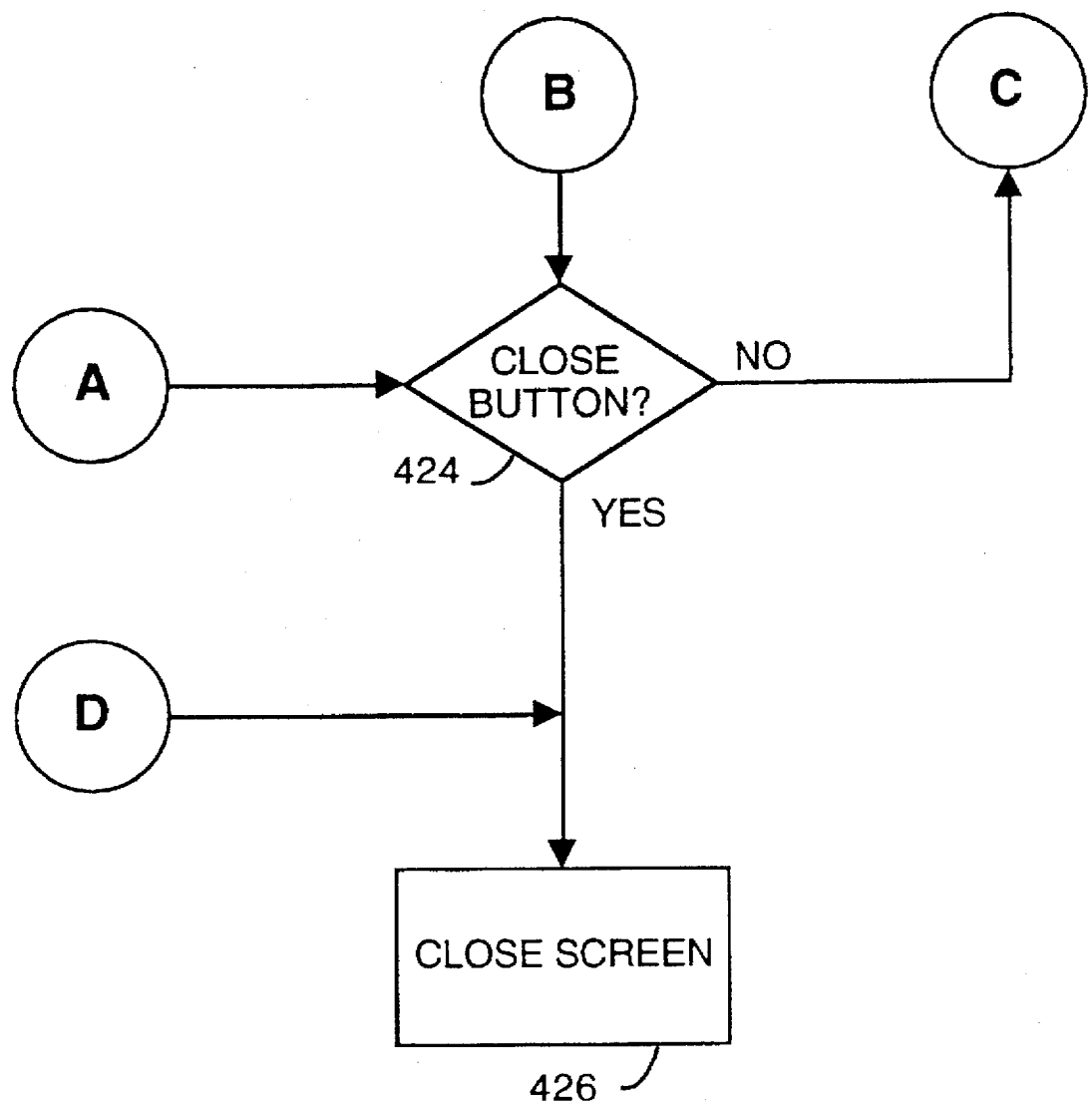

Turning to FIGS. 11A and 11B, the management of the system operator screens for the transfer process is shown. The management of the system operator screens begins at step 390 and advances to step 392 where the system's historical file is loaded. The system queries at step 394 as to whether or not the loading of the historical table was successful. If the response to the query at step 394 is "NO," then the system follows Path D to step 426 where the program screen is closed down and the system operator is returned to the system menu. If the response to the query is "YES," then the system advances to step 396 where the system operator is given the opportunity to read the available keys for making an account selection. The system then advances to step 398 where a query is posed as to whether or not to select from an available list of transactions. If the response is "YES," then the system initializes the data field of the source account with the historical account field at step 400; the selected transaction is then displayed to the system operator at step 402 before taking Path A to step 424. If the query response is "NO," then the system advances to the query at step 404.

Step 404 queries as to whether or not the destination account field is to be selected. If the response to the query is "YES," then the system queries as to whether or not the destination account has been read properly. If the response is "YES," then the destination account is initialized with destination field data at step 408 before advancing along Path A to step 424. If the response to the query at step 406 is "NO," then the system displays for the system operator the legend: UNKNOWN ACCOUNT NO. at step 410 before advancing along Path A to step 424. If the response to the query at step 404 is "NO," then at step 412 the system inquires as to whether or not the confirmation key has been selected.

If the confirmation key is selected at step 412, then the system poses an inquiry at step 414 as to whether or not the source and destination accounts are known. If the accounts are known then the account transfer is conducted at step 416 before advancing along Path A to step 424. If the source and destination accounts are not known, then at step 418 the system displays the known account before advancing along Path A to step 424. If the response to the query at step 412 is "NO," then the system inquires at step 420 as to whether the HELP key is required. If the response is "YES," then the on-line HELP function is activated at step 422 for the system operator before the system advances along Path A to step 424. If the response to the query at step 420 is "NO," then the system advances along Path B directly to step 424.

Step 424 is a query as to whether or not a CLOSE key is to be selected. If the response to the query is "NO," then the system advances along Path C to re-enter at step 396. If the response to the query is "YES," then the CLOSE button is selected and the program screen is closed down at step 426 and the system operator is returned to the system menu. The system operator has the option of printing out a transfer report; the mechanism for managing the report print is shown in FIG. 12.

Figure 12:
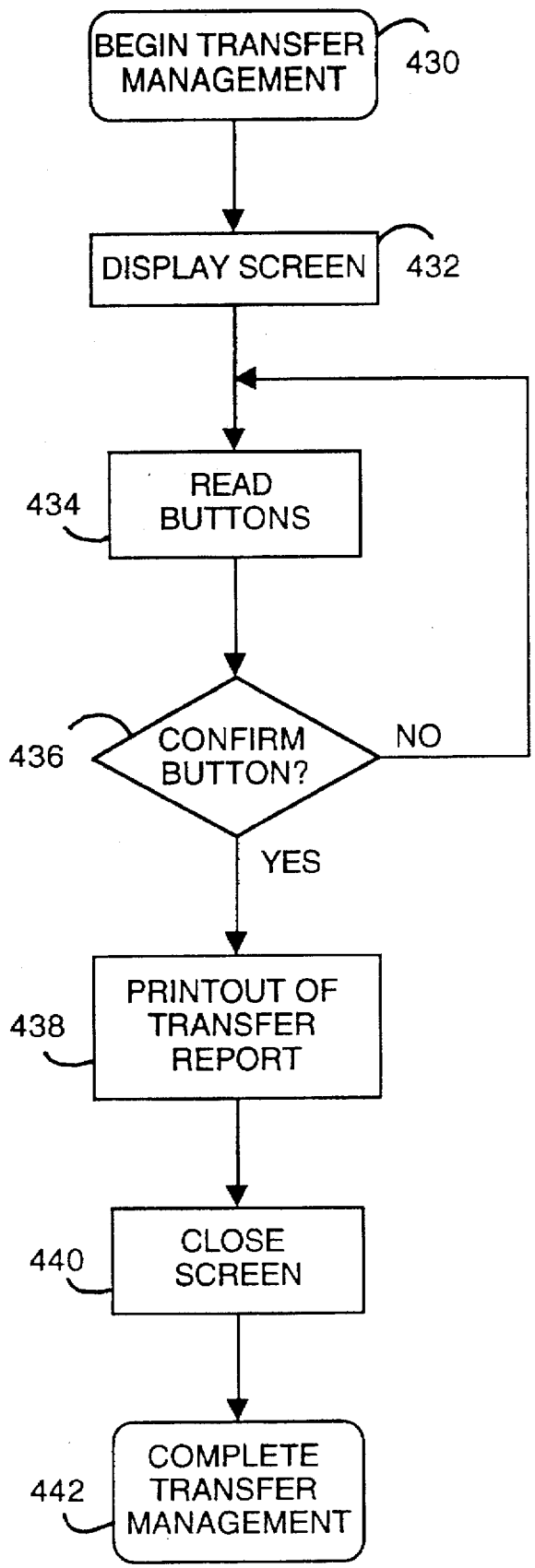
FIG. 12 is a flow chart of the management of the display and printing of the transfer process report.

Turning to FIG. 12, the management of the system operator screens for the printing of the report that details the movements of account data during a transfer is shown. The transfer report management begins at step 430 and advances to step 432 where the transfer process is displayed. At step 434, the system operator can read the key captions for those keys available during the transfer process. The system operator is queried at step 436 as to whether or not the confirm key is to be selected. If the response is "NO," then the system re-enters the program flow just prior to step 434. If, however, the response is "YES," then a printout of the transfer report is printed at step 438; the screen is closed out at step 440; and, then the system completes the transfer management process at step 442.

A rectification is another method of making changes within the system. Rectification becomes necessary when it is determined that the ascending and descending registers of the system's postage franking meter do not correlate with the ascending and descending registers as recorded by the data processing system. This can occur when the postage franking meter is taken out of the system and used off-line for a period of time before being placed back into the system. In FIG. 13, the steps of the rectification process are shown.

A rectification consists of several steps; these are: determining that the ascending and descending registers of the postage meter do not correlate with the ascending and descending registers as recorded by the system; determining a value difference between the registers of the postage meter and the recorded registers of the system; selecting a customer account to be rectified; calculating a value amount by which the chosen account will be rectified, the value amount based upon the value difference and any surcharge or discount corresponding to the chosen account; and, posting the value amount to the selected customer account.

Turning to FIG. 13, the need for a rectification is decided upon at step 450. The system then determines, at step 452, the difference in amount between the ascending and descending registers of the postage franking meter and the ascending and descending registers as recorded by the system data processor. At step 454, the system operator selects a destination account and advances to step 456 where the system data processor increments the recorded meter registers until they match the registers of the postal franking meter. The system advances to step 458 where a transaction record is generated within the destination account; the destination account can be a "dummy" or "house" account used for detailing register differences, or a customer account can be selected.

The system queries at step 460 as to whether or not there was an error in generating the transaction record. If the response to the query is "YES," then the system restores the log files at step 462 and then advances to step 466 where the account correction is completed. If the response to step 460 is "NO," then the system suppresses the log file restoration at step 464 and then advances to step 466 where the account correction is completed.

Figure 14A:
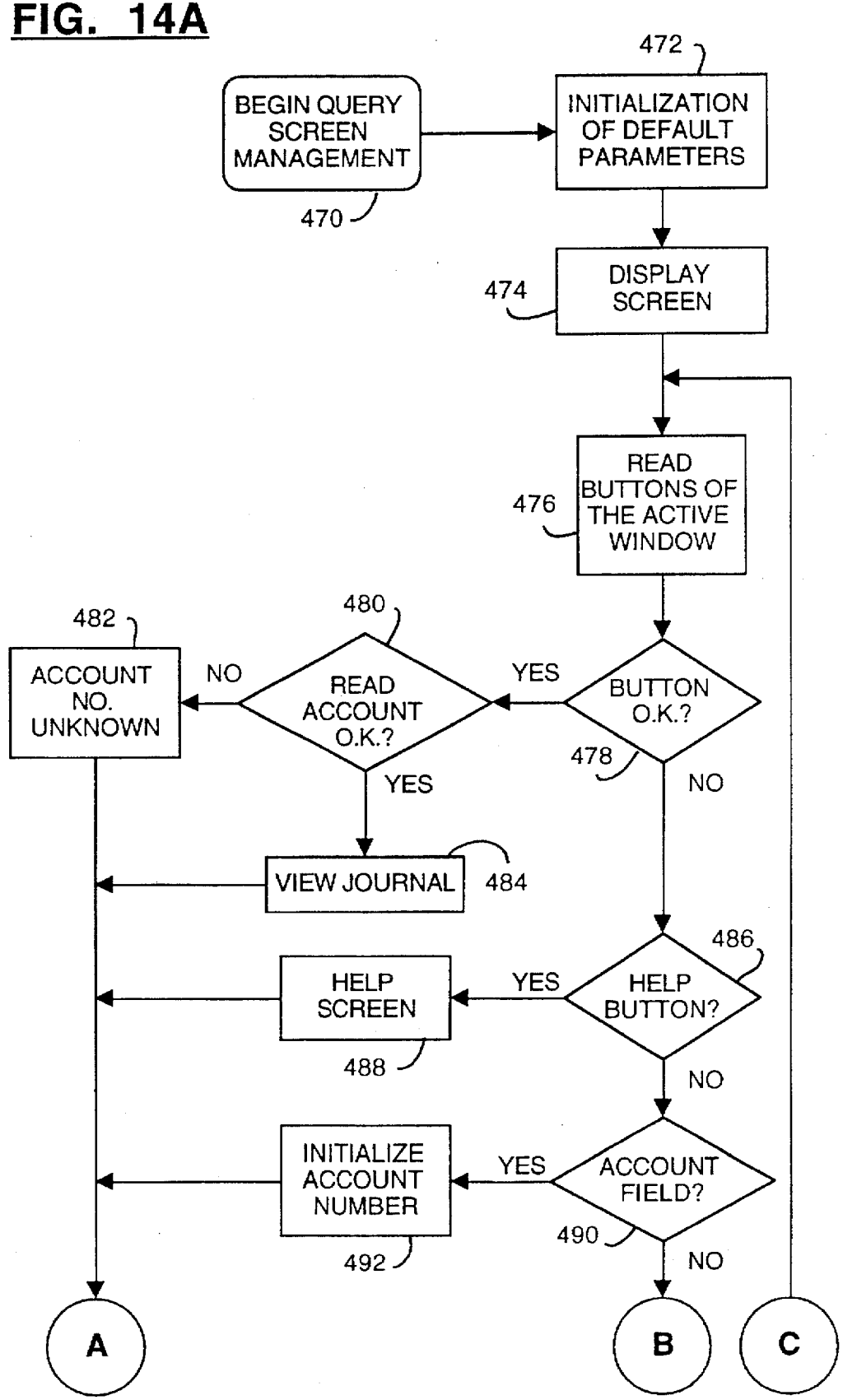
FIG. 14A and FIG. 14B are flow charts for the management of the franking journal queries which make it possible to view and print out the transactions executed for a given account.
Figure 14B:
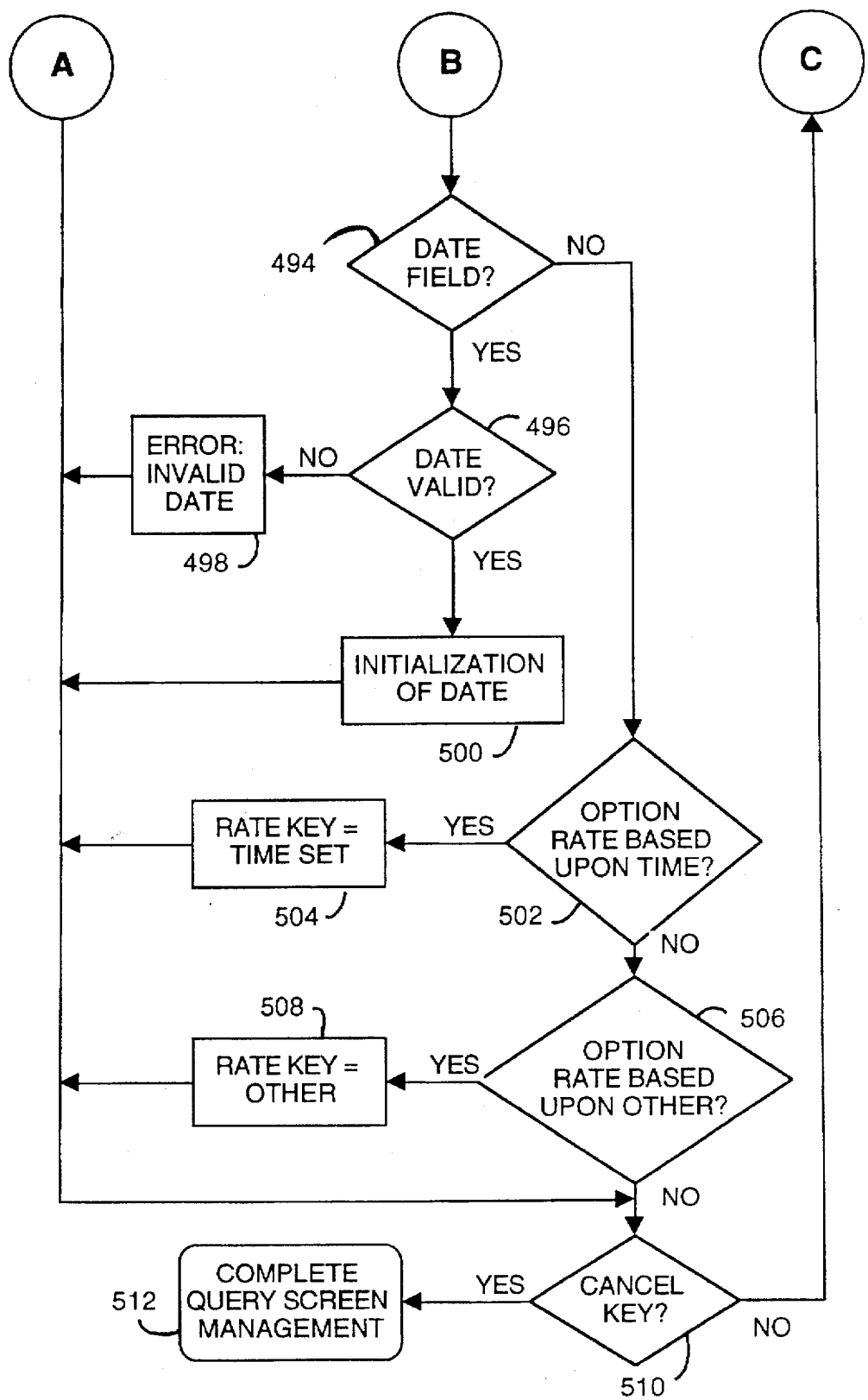

Turning to FIG. 14A and FIG. 14B, there is shown the management of the franking journal queries which make it possible to view and print out the transactions executed for a given account. Query screen management begins at step 470 and advances to step 472 where initialization of the default parameters occurs. The system displays the data fields at step 474; and, then the system operator, at step 476, can read which keys are available for operation in the active window. At step 478, the system inquires as to whether the selected keys were correct. If the response to the inquiry is "YES," then the system advances to step 480 and queries as to whether the account data can be read. If the response to the query at step 480 is "NO," then the system displays the legend: ACCOUNT NO. UNKNOWN and advances along Path A to re-enter the program at step 510. If the response to the query at step 480 is "YES," then the system allows the system operator to view the transaction journal at step 484 before advancing along Path A to re-enter the program at step 510. If, however, the response to the query at step 478 is "NO," then the system moves on to step 486.

At step 486, the system queries as to whether or not the HELP key is to be selected. If the response to the query is "YES," then the system displays the HELP screen at step 488 before advancing along Path A to re-enter the system at step 510. If the response to the query is "NO," then the system inquires, at step 490, as to whether or not the account field is to be displayed. If the response to the query at step 490 is "YES," then the account number and field are initialized at step 492, and the system advances along Path A to re-enter the program at step 510. If the response to the query at step 490 is "NO," then the system advances along Path B to a query at step 494.

The system queries at step 494 as to whether the date field is to be selected and what the required entry to the field is. If the response is "YES," then the system queries at step 496 as to whether the selected date is valid or not. If the response to the query is "NO," then the system displays: ERROR— INVALID DATE at step 498 and then advances along Path A to re-enter the program at step 510. If however, the response to the query at step 496 is "YES," then the system initializes the date at step 500 and advances along Path A. If the response at step 494 is "NO," then the system advances to a query at step 502.

At step 502, the system queries as to whether or not there is a rate to be assessed based upon time parameters. This query is effective in assessing day or morning rates where those distinctions may be available. If the response is "YES," then the rate key is set to the proper time setting at step 504 and the system advances to Path A. If the response to the query at step 502 is "NO," then the system moves to the query at step 506 and queries as to whether or not there are any other optional rates. If the response is "YES," then the system sets the rate key based upon the options criteria at step 508, then advances to Path A.

All advances along Path A, and a "NO," response to the query at step 506 re-enter the program at step 510. Step 510 inquires as to whether or not the cancel key is to be selected. If the response is "NO," then the system advances along Path C and re-enters the program at step 476. If the response to the query at step 510 is "YES," then the query screen management is completed at step 512.

Figure 15:
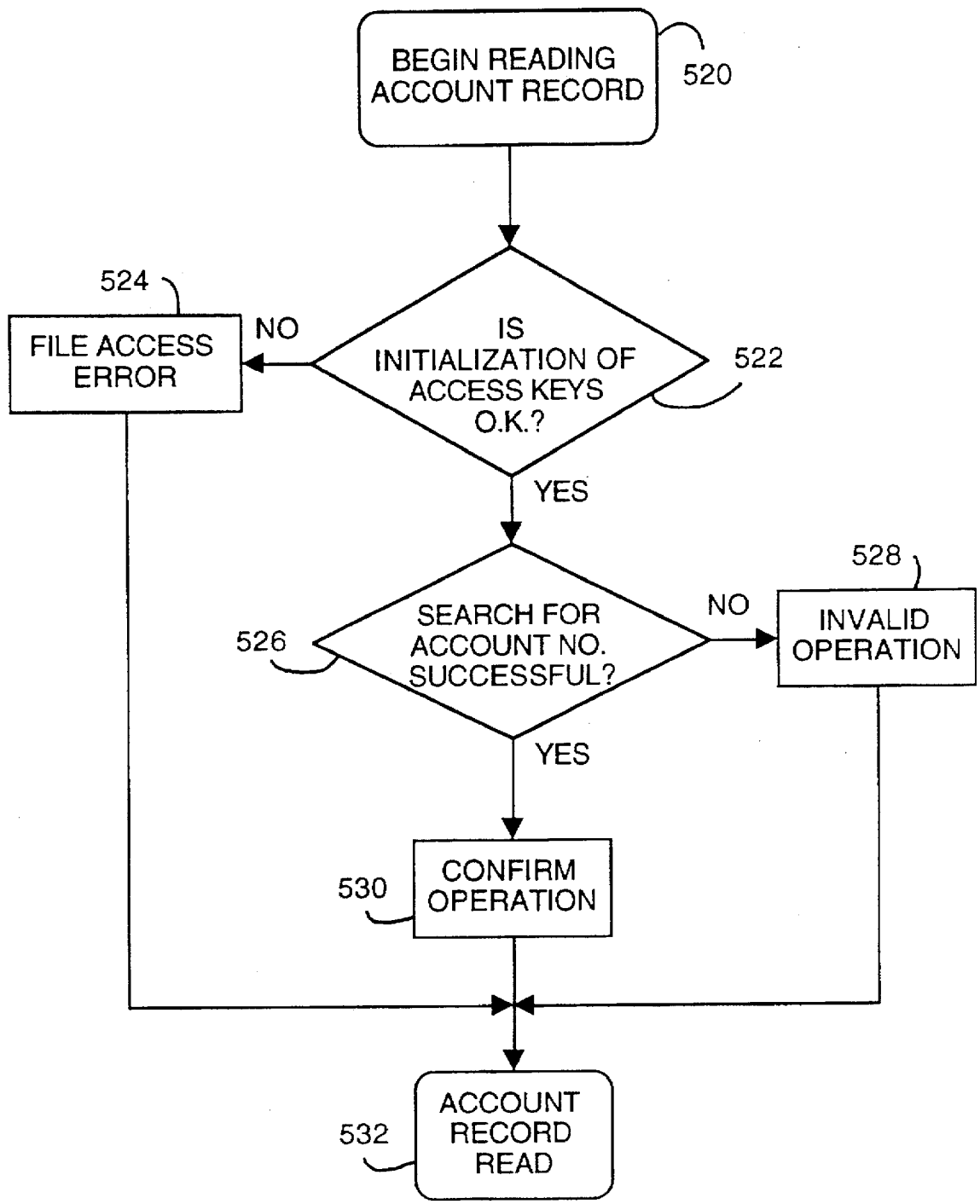
FIG. 15 is a flow chart of the read account function which is used to determine the existence of, or lack of, an account and to read the account record if the account number is accessible.

Turning to FIG. 15, the read account function which is used to determine the existence of, or lack of, an account and to read the account record if the account number is accessible is shown. The system begins reading the account record at step 520, and then advances to a query at step 522.

The system queries, at step 522, as to whether or not initialization of the access keys has occurred. If the response is "NO," then the system indicates a file access error at step 524 before advancing to step 532 where the reading of the account record is concluded. If the response to the query at step 522 is "YES," then the system advances to step 526 and queries as to whether or not a search for the account number has been successful. If the response to the query is "NO," then an invalid operation is displayed to the system operator at step 528 before advancing to step 532 where the reading of the account record is concluded. If the response to the query at step 526 is "YES," then the system confirms the operation at step 530 before concluding the account reading at step 532.

Figure 16:
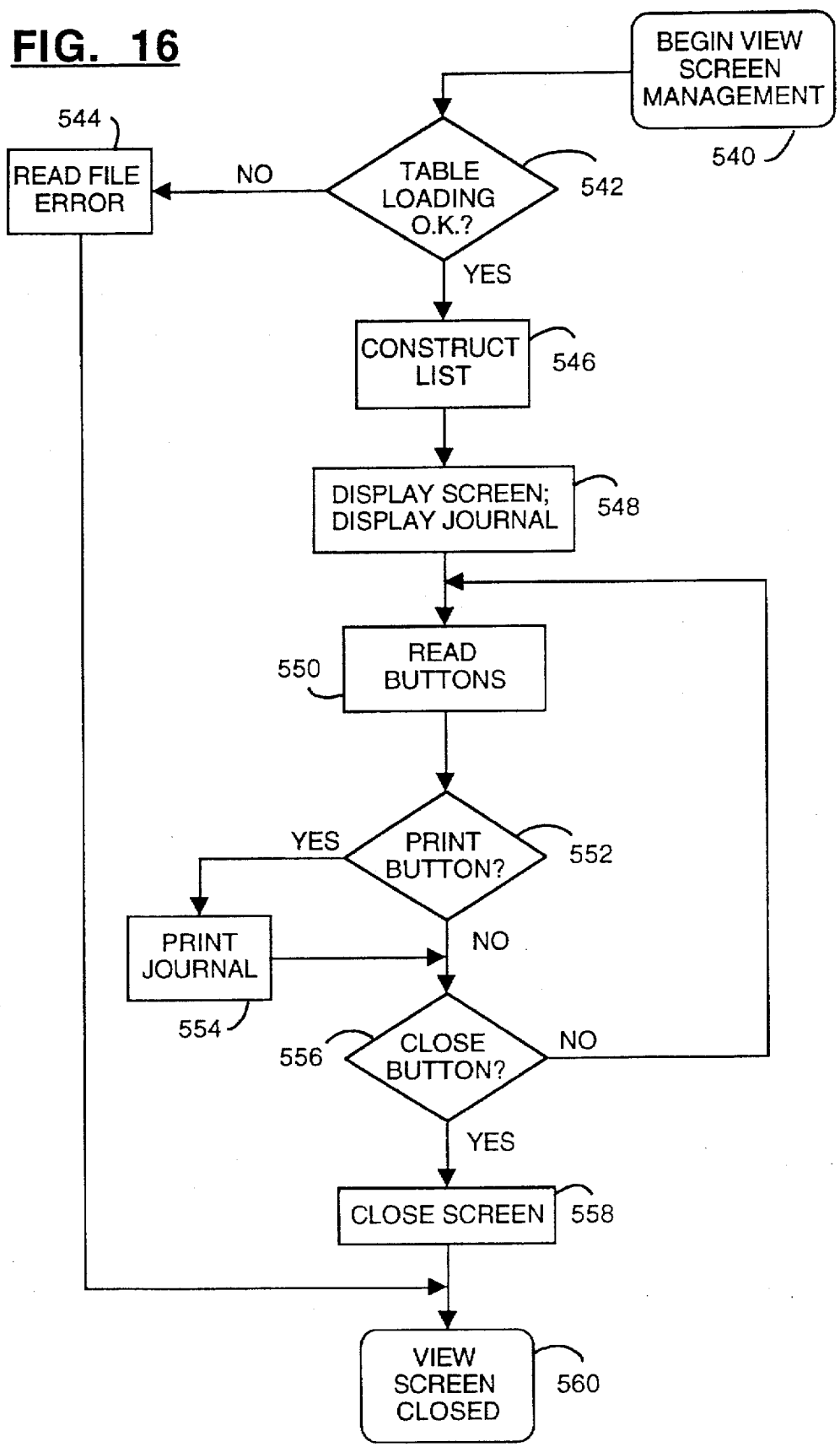
FIG. 16 is a flow chart of the system reports can be viewed and/or printed.

Turning to FIG. 16, there is shown the screen management process for viewing the reports and for the printing flow. The view screen management begins at step 540 and advances to the query at step 542 which inquires as to whether or not the table loading of the reports was successful. If the response is "NO," then the system advances to step 544 which indicates a read file error to the system operator before advancing to step 560 where the view screen for this process is closed and the system operator is returned to the system menu. If, however, the response to the query at step 542 is "YES," then the system constructs a list of the data fields to be viewed at step 546. The system then displays the listed screens and the journal at step 548. At step 550, the system operator is given the opportunity to view the keys that are active; and then, at step 552, the system queries as to whether or not the PRINT key is to be selected. If the response is "YES," then the system prints the journal at step 554 and re-enters the program flow at step 556. If the response to the query at step 552 is "NO," then the system advances to step 556.

At step 556, the system queries as to whether or not the CLOSE button is to be selected. If the response to the query is "NO," then the system re-enters the program at step 550. If, however, the response to the query at step 556 is "YES," then the system advances to step 558 where the screen is prepared for closing, and then to step 560 where the screen is closed and the system operator is returned to the system menu.

Figure 17A:
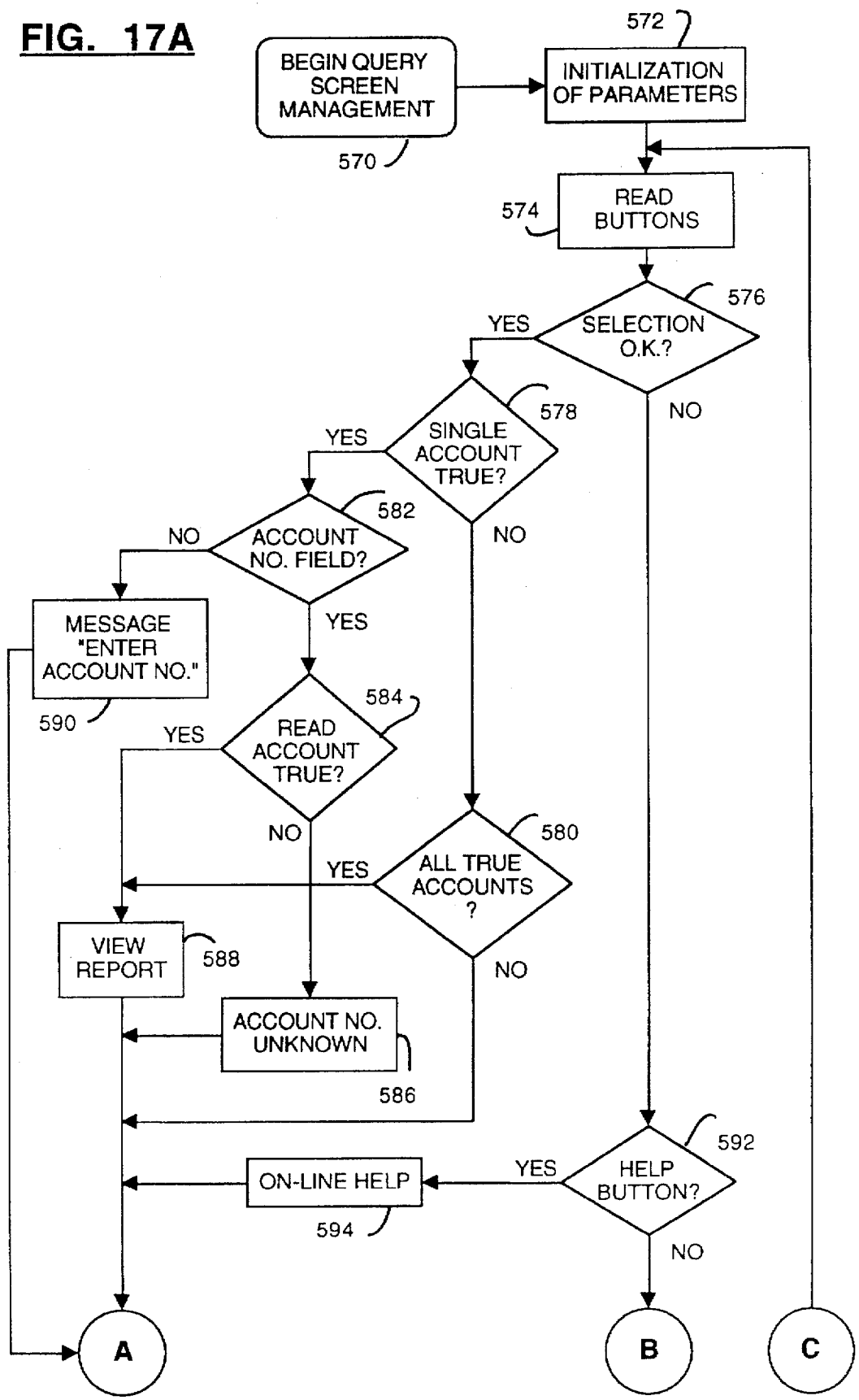
FIGS. 17A, 17B, and 17C are flow charts of the viewing of reports that can be generated by the system.
Figure 17B:
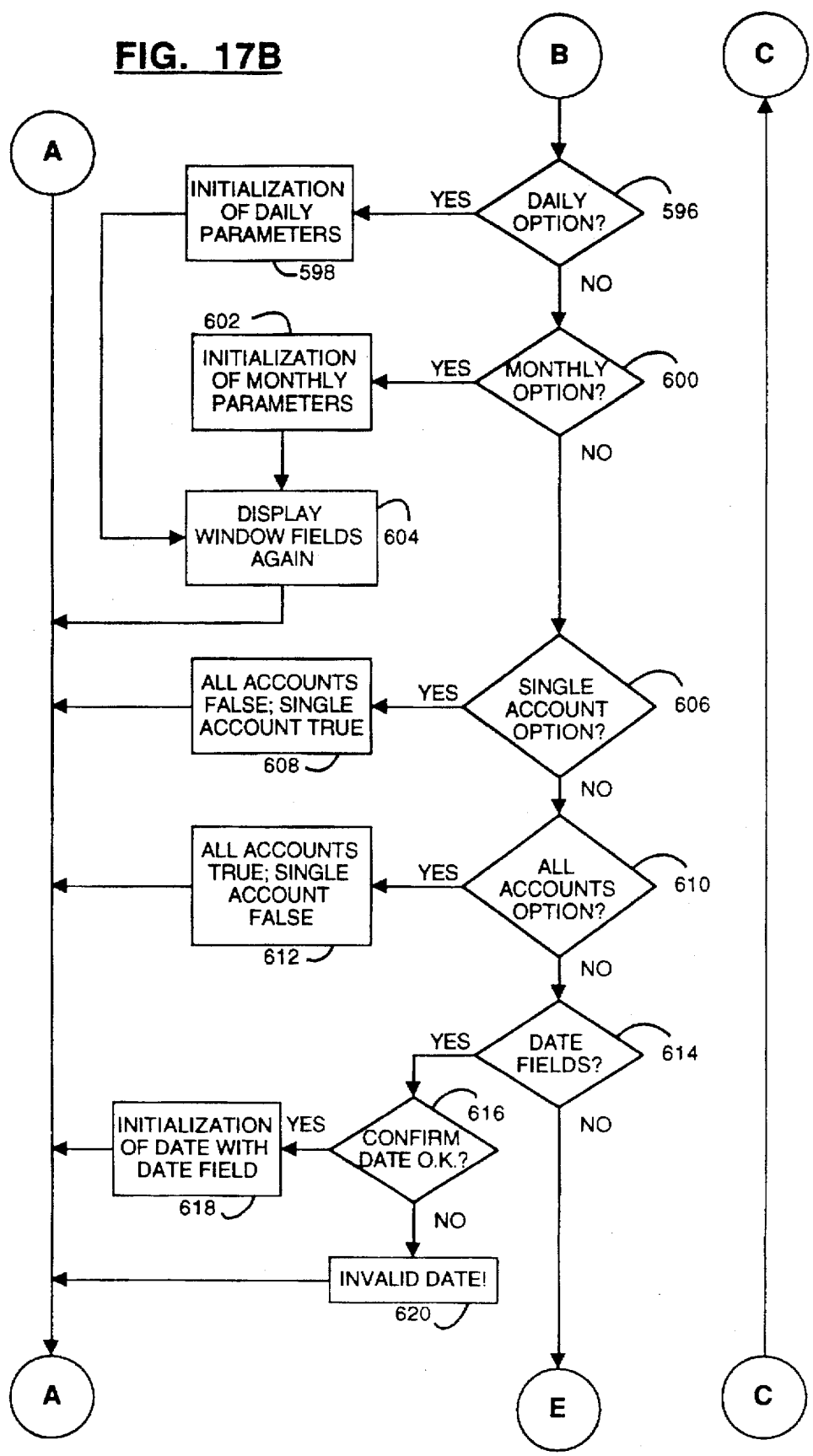
Figure 17C:
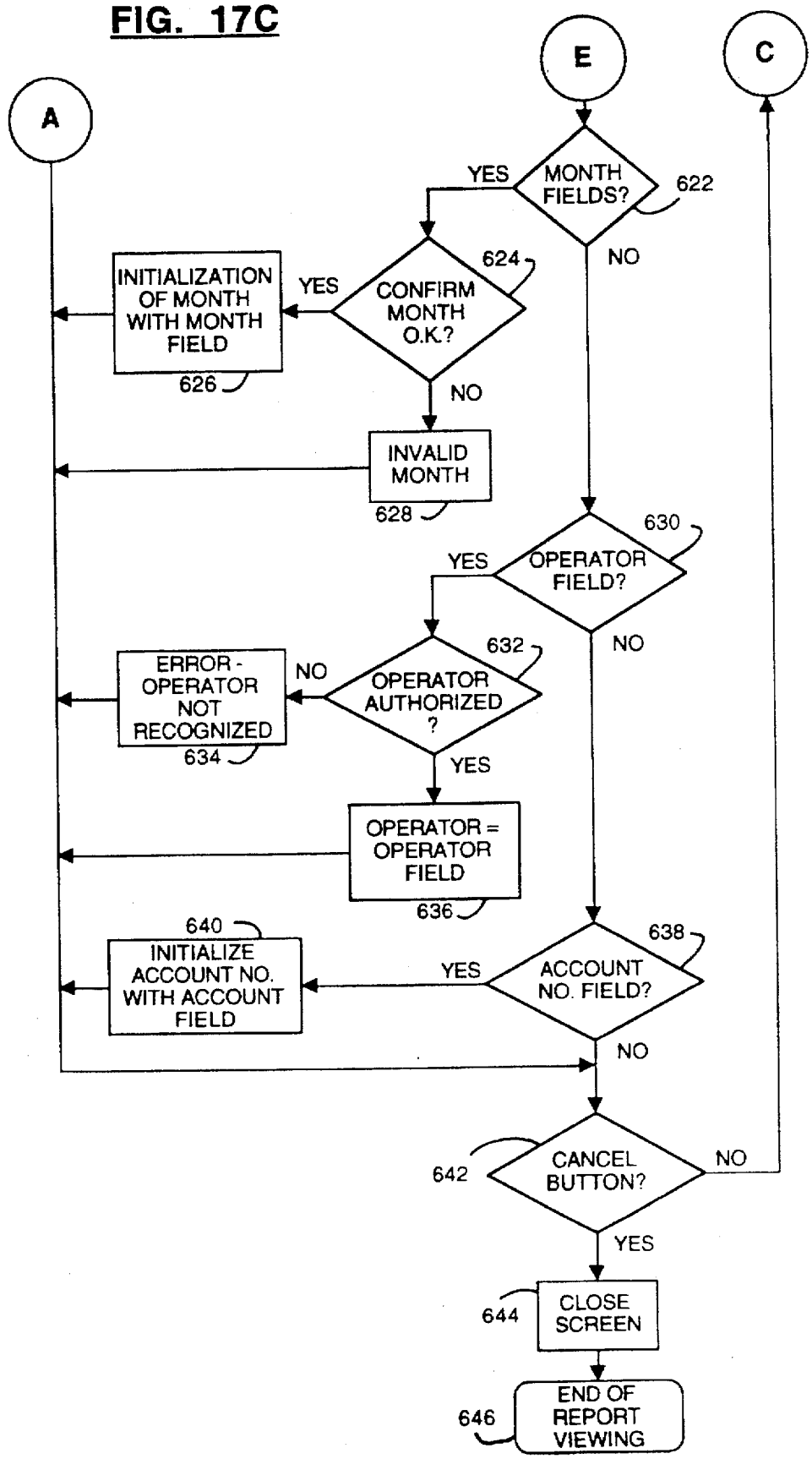

Turning to FIGS. 17A, 17B and 17C, there is shown the process by which reports that the system produces, can be viewed. Query screen management begins at step 570 and then advances to step 572 where initialization of the field parameters takes place. The system operator is given the opportunity, at step 574, to read the active keys available for system operation. The keys are selected that will input the account number and, at step 576, the system will query as to whether or not the selection is correct.

If the response to the query at step 576 is "YES," then the system will query, at step 578, as to whether or not the chosen account is a single account; this done by inquiring as to whether a single account equals true. If the response to the query at step 578 is "YES," then the system, at step 582, will query as to whether or not the account number field is correct. If the response to the inquiry is "NO," then the system displays, at step 590, the legend: ENTER ACCOUNT NO. then advances along Path A to re-enter the system at step 642.

If the response to the query at step 578 is "NO," then the system will query, at step 580, as to whether or not the selection of all accounts is set as a true event. If the response to the query is "YES," then the report can be viewed by the system operator at step 588 before the system advances along Path A to re-enter the system at step 642. If the response to the query at step 580 is "NO," then the system advances directly to Path A.

If the response to the query at step 582 is "YES," then the system will query, at step 584, as to whether or not the account selected is able to be read. If the response to the query is "YES," then the report can be viewed by the system operator at step 588 before the system advances along Path A to re-enter the system at step 642. If the response to the query at step 584 is "NO," then the system displays: UNKNOWN ACCOUNT NO., at step 586, before advancing along Path A.

If the response to the query at step 576 is "NO," then the system will query, at step 592, as to whether or not the HELP key has been selected. If the HELP key has been selected, then the system advances to step 594 where the on-line help is utilized. The system then advances along Path A. If, however, the response to the query at step 592 is "NO," then the system advances along Path B to the query posed at step 596.

At step 596, the system queries as to whether or not the daily report option is being selected. If the response is "YES," then the system initializes the daily parameters at step 598, and then advances to step 604 where the available window fields are once again displayed for the system operator. If the response to the query at step 596 is "NO," then the system queries at step 600 as to whether or not a monthly option for the report is to be selected. If the response is "YES," then the system initializes the monthly parameters at step 602, and then advances to step 604 where the available window fields are once again displayed for the system operator; from step 604 the system advances to Path A to re-enter the method flow at step 642 of FIG. 17C. If the response to the query at step 600 is "NO," then the system advances to step 606.

At step 606, the system queries as to whether or not a single account option is being selected. If the response is "YES," then at step 608, the all accounts field is set to false and the single accounts field is set to true. If the response to the query of step 606 is "NO," then the system queries at step 610 as to whether or not the all accounts option is to be selected. If the response is "YES," then at step 612, the all accounts field is set to true and the single accounts field is set to false. The system advances from steps 608 and 612, along Path A, to step 642.

If the response to the query at step 610 is "NO," then the system inquires at step 614 as to whether or not the reports are to be based on selected date fields. If the response is "YES," then the system will inquire at step 616 as to whether the selected dates are correct. If the response is "YES," then the system will initialize the date with the date field at step 618 before advancing along Path A to re-enter the method flow at step 642 of FIG. 17C. If, however, the response at step 616 is "NO," then the legend: INVALID DATE will be displayed to the system user at step 620 before advancing along Path A. If the response to the query at step 614 is "NO," then the system will advance along Path E, to the query at step 622.

At step 622, the system queries as to whether or not a particular month is to be selected for the report field. If the response to query is "YES," then the system inquires at step 624 as to whether the selected month is the correct one; and, if the response to the query is "YES," then the system will perform an initialization of the month with the month field at step 626 before advancing along Path A to step 642. If the response to the query at step 624 is "NO," then the system will display at step 628: INVALID MONTH and advance to Path A.

If the response to the query at step 622 is "NO," then the system queries at step 630 as to whether or not an operator field is to be selected. If the response is "YES," then the system queries at step 632 as to whether or not the operator is authorized to use this field. If the response to the query is "NO," then the system indicates to the system operator, at step 634, that there is an: ERROR—OPERATOR NOT RECOGNIZED. If, however, the response to the query at step 632 is "YES," then the operator equals the operator field and this is displayed at step 636. Steps 634 and 636 then advance to Path A.

If the response to the query at step 630 is "NO," then the system queries at step 638 as to whether or not an account number field is to be selected. If the response is "YES," then the account number field is initialized at step 640 and the system advances along Path A to step 642. If the response to the query at step 638 is "NO," then the system advances to step 642.

All entries into Path A, and a "NO," response to the query at step 638, advance to the query of step 642. At step 642, the system queries as to whether or not the CANCEL key is to be selected. If the response is "NO," then the system advances along Path C to re-enter the program at step 574 where the system operator is given the opportunity to select among the available keys of the active screen. If the response to the query at step 642 is "YES," then the system will close the screen at step 644, and then end report viewing at step 646.

Figure 18:
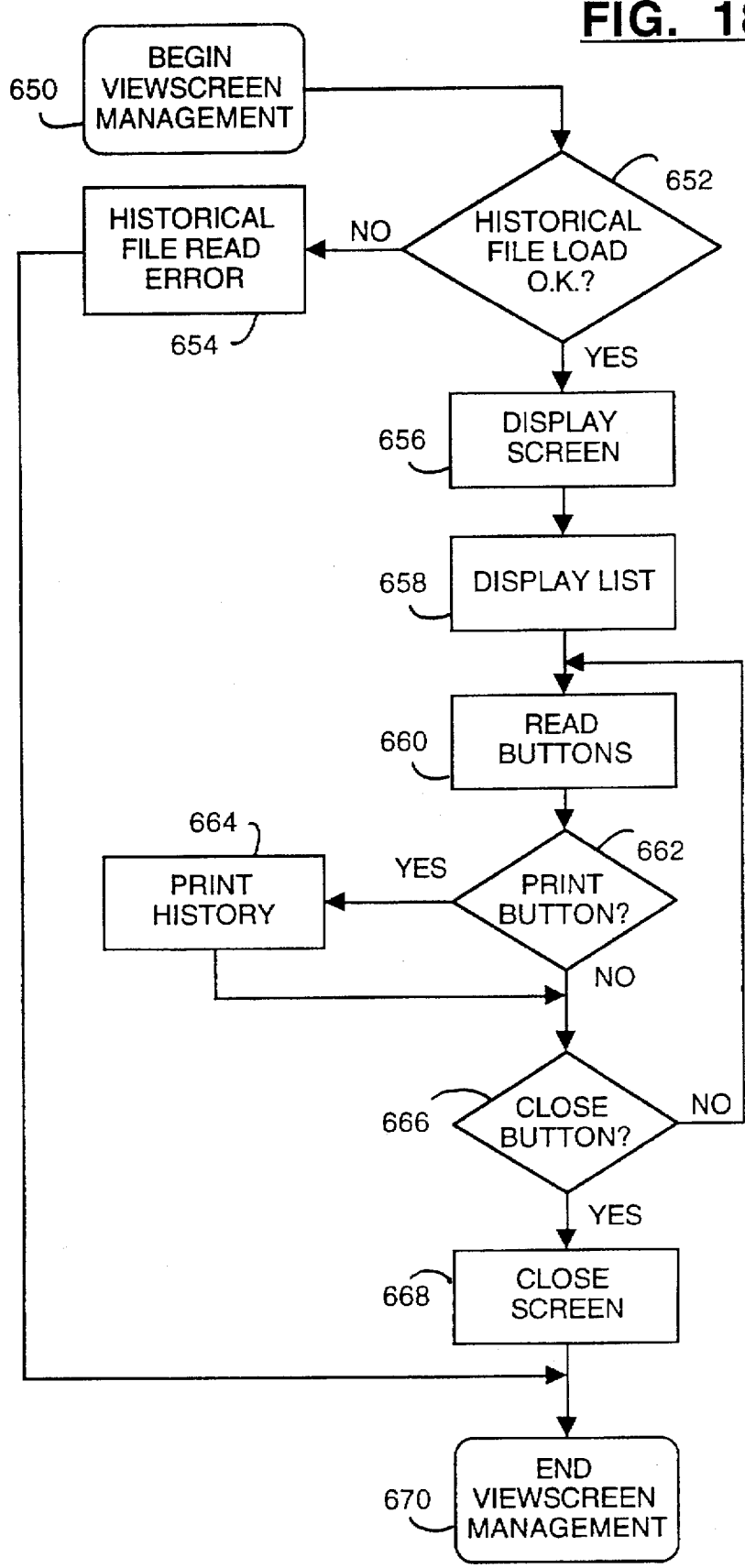
FIG. 18 is a flow chart of the management of view screen and/or printing process for the transaction history.

Turning to FIG. 18, the procedure for managing the viewscreens when displaying a transaction are shown. Viewscreen management begins at step 650 and then advances to the query at step 652. At step 652, the system inquires as to whether or not the loading of the historical file was correct. If the response is "NO," then the system advances to step 654 which indicates a read file error to the system operator before advancing to step 670 where the view screen for this process is closed and the system operator is returned to the system menu. If, however, the response to the query at step 652 is "YES," then the system displays the data fields available at step 656 and the system constructs a list of the data fields to be viewed. The system then displays the listed fields at step 658. At step 660, the system operator is given the opportunity to view the keys that are active; and then, at step 662, the system queries as to whether or not the PRINT key is to be selected. If the response is "YES," then the system prints the journal at step 664 and re-enters the program flow at step 666. If the response to the query at step 662 is "NO," then the system advances directly to step 666.

At step 666, the system queries as to whether or not the CLOSE button is to be selected. If the response to the query is "NO," then the system re-enters the program at step 660. If, however, the response to the query at step 666 is "YES," then the system advances to step 668 where the screen is prepared for closing, and then to step 670 where the viewscreen management is ended and the system operator is returned to the system menu.

Figure 19A:
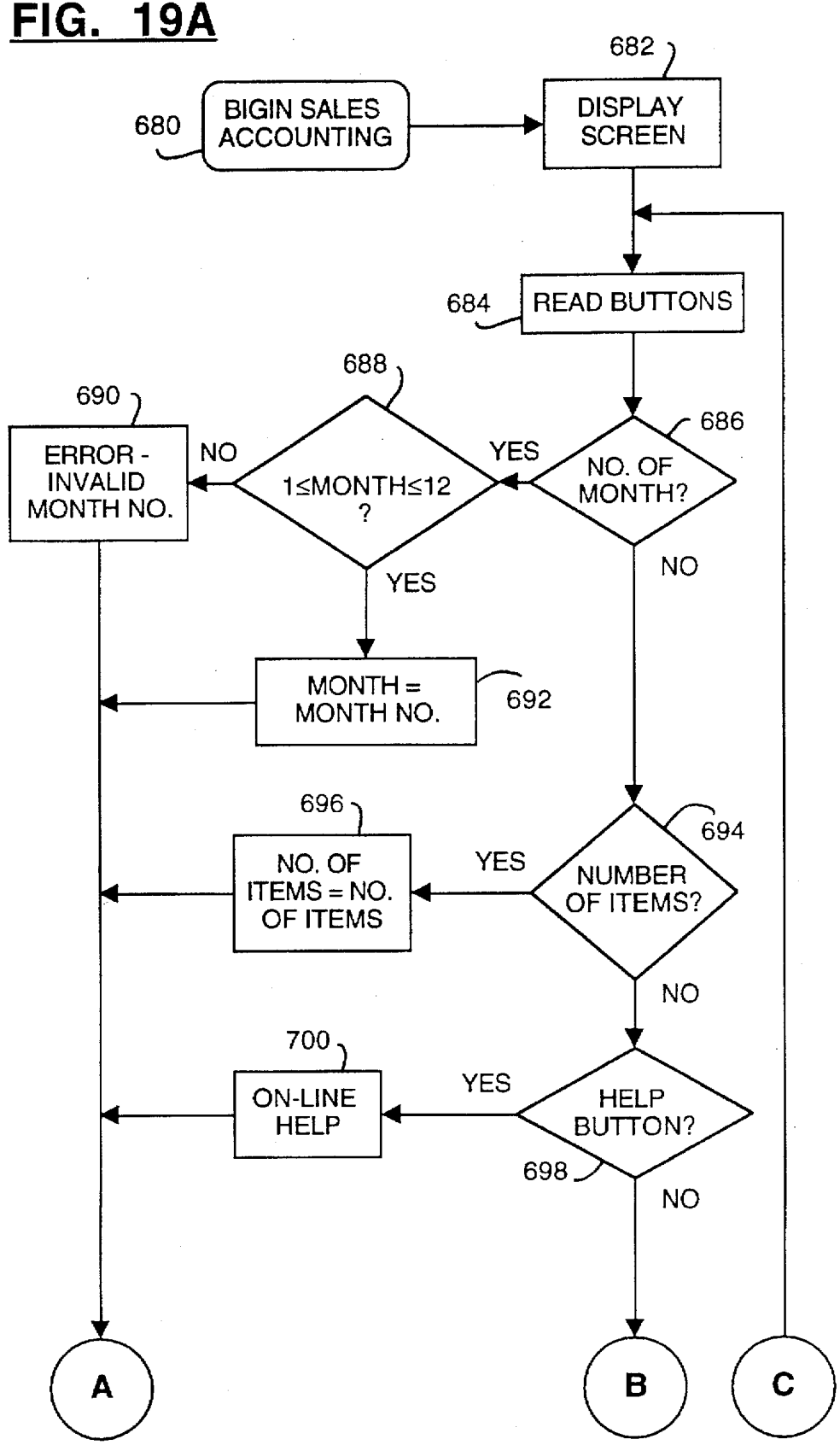
FIG. 19A and FIG. 19B are flow charts of the preparation of the system monthly report for the transactions accumulated from day to day.
Figure 19B:
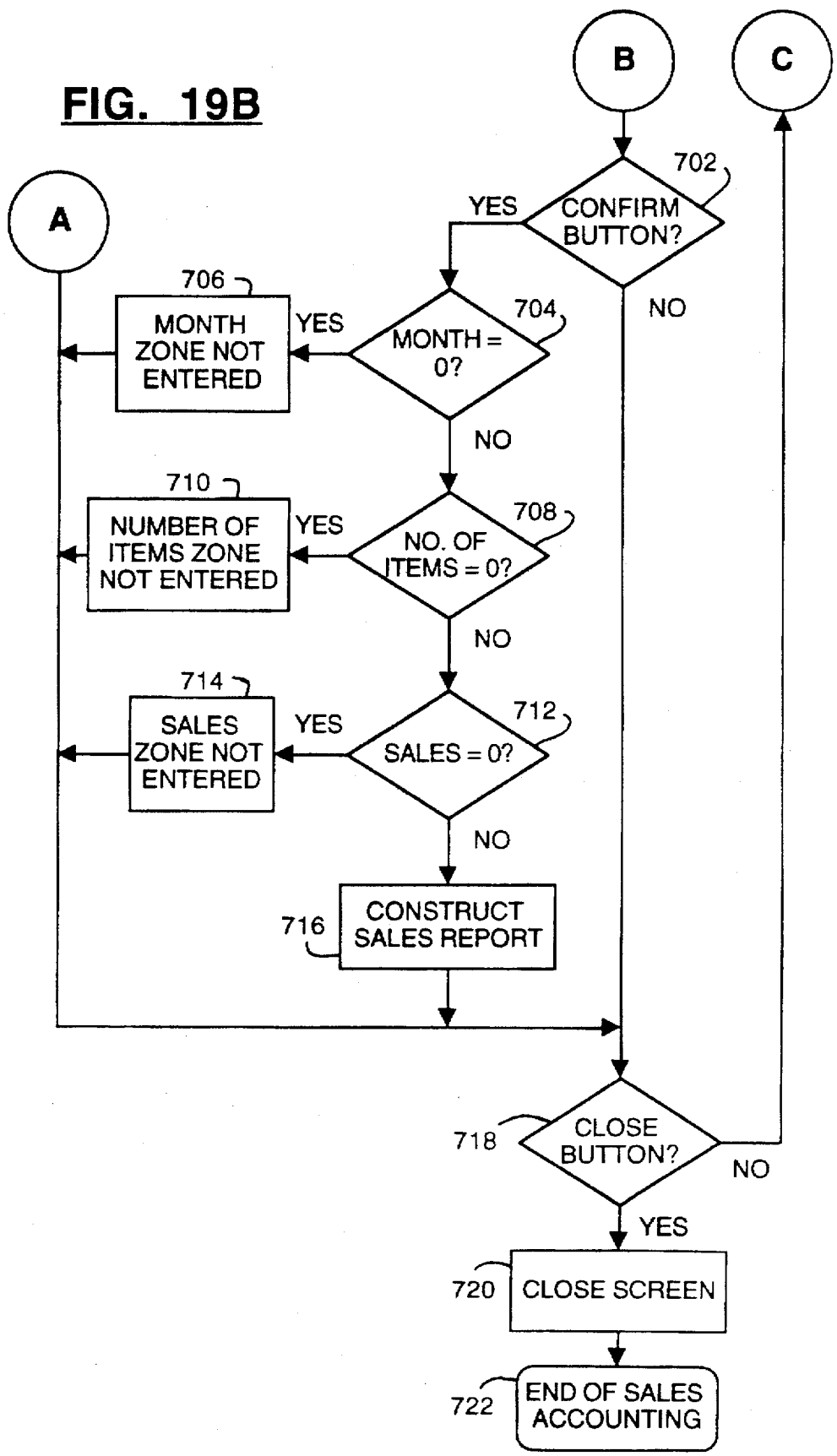

Turning to FIGS. 19A and 19B, the viewing of customer services and the management of the fields which produce the monthly sales report are shown. Sales accounting is begun at step 680 and advances to step 682 where the report fields are displayed for the system operator. When the display screen is active, the system advances to step 684 where the operational keys available to the system operator can be viewed and activated before advancing to the query at step 686. At step 686, the system queries as to whether or not a month number is to be selected. If the response is "YES," then the system queries at step 688 as to whether the month lies in the field $1 \leq \text{month} \leq 12$. If the response is "NO," then, at step 690 the system displays: ERROR—INVALID MONTH NO. After the display of step 690, the system advances along Path A to step 718.

If, however, the response to the query at step 688 is "YES," then at step 692 the month is set equal to the month number and then the system advances to Path A. If the response to the query at step 686 is "NO," then the system advances to step 694 where the system queries as to whether the number of items to be set in the accounting field will be used as a parameter. If the response to the query is "YES," then the number of items is set equal to the number of items at step 696 before advancing to Path A. If the response to the query at step 694 is "NO," then the system advances to the inquiry at step 698.

Step 698 is an inquiry as to whether the system operator requires the assistance of the HELP key. If the response is "YES," then on-line HELP is made active at step 700. After use of the on-line HELP, the system advances to Path A. If the response at step 698 is "NO," then the system advances along Path B to step 702. Step 702 is a query as to whether confirmation is to be selected for a number of accounting fields. If the response is "YES," then the system inquires as to whether: the month=0 at step 704; the number of items=0 at step 708; and, sales=0 at step 712.

If the response to the query at step 704 is "YES," then the month zone is not entered into the report fields at step 706 and the system advances to Path A. If the response to the query at step 708 is "YES," then the number of items zone is not entered into the report fields at step 710 and the system advances to Path A. And, if the response to the query at step 712 is "YES," then the sales zone is not entered into the report fields at step 714 and the system advances to Path A.

If the response to the query at step 704 is "NO," then the month zone will be reserved for entry into the sales report and the system advances to the query at step 708. If the response to the query at step 708 is "NO," then the number of items zone will be reserved for entry into the sales report and the system advances to the query at step 712. And, If the response to the query at step 712 is "NO," then the sales zone will be reserved for entry into the sales report and the system advances to step 716 where the sales report is constructed. After the sales report is constructed the system advances to Path A.

All entries into Path A, and a "NO," response to the query at step 702, advance the system to the query of step 718. At step 718, the system queries as to whether or not the CLOSE key is to be selected. If the response is "NO," then the system advances along Path C to re-enter the program at step 684 where the system operator is given the opportunity to select among the available keys of the active screen. If the response to the query at step 718 is "YES," then the system will close the screen at step 720, and then end report viewing at step 722.

Figure 20:
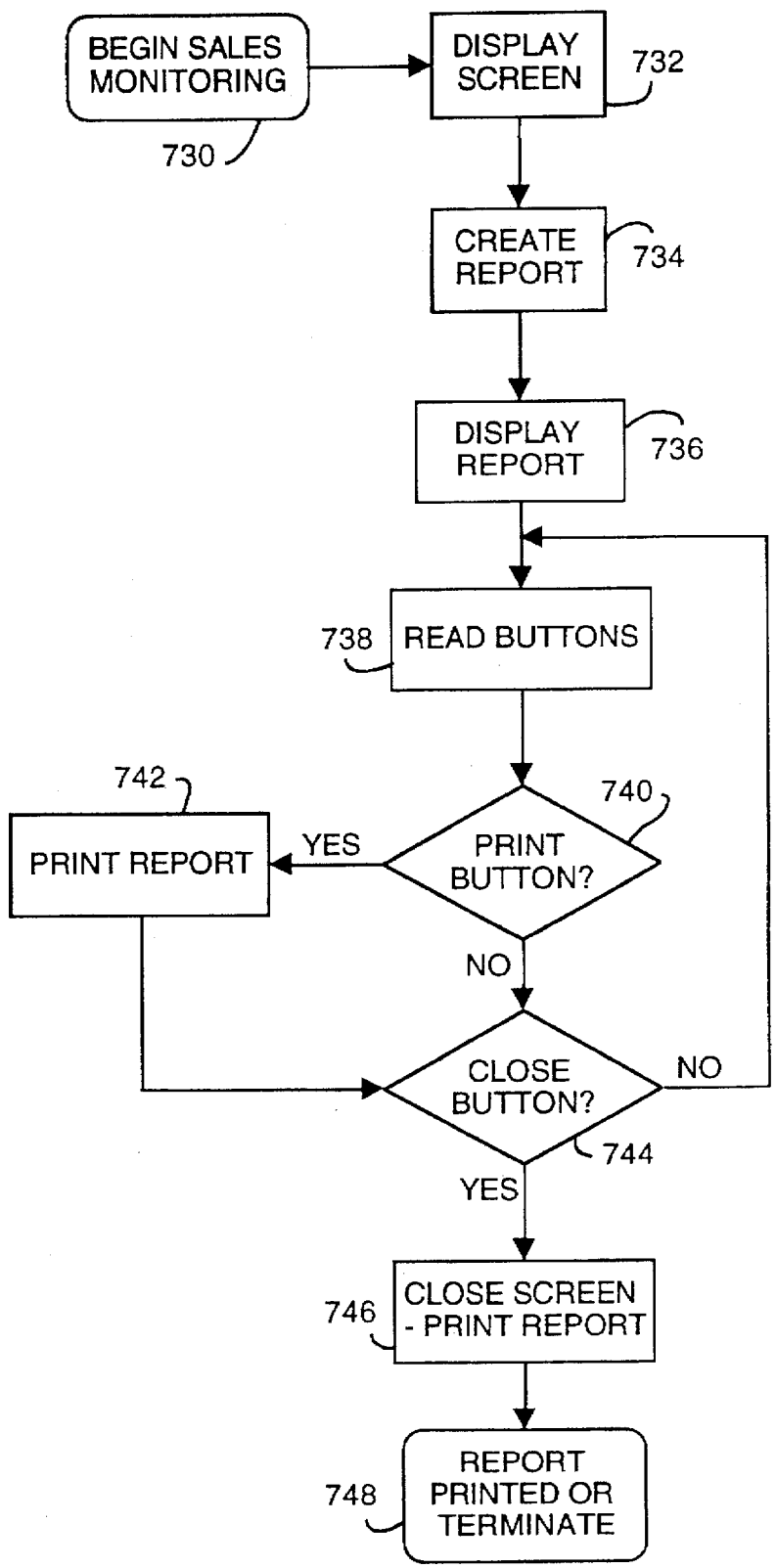
FIG. 20 is a flow chart for the creation and accumulation of the different columns for monitoring sales.

Turning to FIG. 20, the steps for the creation and accumulation of the different columns for monitoring sales is shown. Sales monitoring begins at step 730 and then advances to the display of the available fields at step 732. From step 732, the system creates the sales report at step 734, displays the report to the system operator at step 736 and then activates operational keys at step 738 for the selection of the system operator. The system advances from step 738 to step 740 where the system queries as to whether or not the print button is to be selected. If the response to the query is "YES," then the system will print the sales report at step 742 before advancing to the query at step 744. If the response to the query at step 740 is "NO," then the system advances to the query at step 744.

At step 744, the system queries as to whether or not the CLOSE button is to be selected. If the response to the query is "NO," then the system re-enters the program at step 738. If, however, the response to the query at step 744 is "YES," then the system advances to step 746 where the screen is prepared for closing, and the sales report is printed. From step 746, the system advances to step 748 where the report has been printed, the screen is closed out, and the system operator is returned to the system menu.

As can be appreciated by those skilled in the art, a number of variations of the subject invention are possible. These variations include, but are not limited to: the nature and scope of each of the hardware components of the data processing system; the ability of the system to handle more than one carrier and the carriers' respective rates; the ability to scan data into the system; the decision on whether or not to accept over the counter traffic as opposed to traffic that is being billed; the extent of the upper print field limit of the print head when recording a transaction value; and, the extent to which data can be downloaded from the system to either a transfer media or to another data processing system.

What is claimed is:

1. A method for franking, accounting, and billing of mail pieces and services, comprising the steps of:
   (a) enabling a data processing system to communicate with a postage meter;
   (b) initializing an application program on said data processing system, in which a customer account can be established or altered;
   (c) entering customer data into said application and determining whether or not said customer will pay for a transaction, upon completion of said transaction, or by being billed at the end of a predetermined time period;
   (d) initiating a transaction by entering additional data and a first set of values into a data field of said application;
   (e) verifying that registers of said meter match a record of said registers maintained within said data processing system, and if said registers do not match, then performing a rectification;
   (f) franking one or more mail piece or pieces with a second value;
   (g) completing said transaction by totaling said first set of values, totaling said second values and, then determining whether or not said transaction data or said transaction value is to be corrected;
   (h) correcting said transaction value by a modification if incorrect and recording said transaction in said data processing system's memory if said transaction value is correct; and
   (i) requesting payment in respect of said transaction or recording said transaction value in said customer account in respect of future billing in accordance with the determination of step (c).

2. The method of claim 1, wherein said transaction comprises the steps of:
   (a) determining a rate to be applied to a batch of mail pieces, said batch of mail pieces containing at least one mail piece;
   (b) introducing said batch of mail pieces to said postage meter and then franking each mail piece of said batch and recording a franked value that is based upon any discounts or contracts that are associated with said customer account; and
   (c) determining whether or not a service or a mail product is to be included in said transaction, and then entering a value for said service or mail product.

3. The method of claim 1, wherein said postage meter is operatively connected to said data processing system by a meter linking device.

4. The method of claim 1, wherein said recorded transactions in said customer account are retained for said predetermined time and a bill is generated in respect of said customer's account.

5. The method of claim 1, wherein said additional data and said customer data are rectified, said rectification comprising the steps of:
   (a) determining that ascending and descending registers of said postage meter do not correlate with ascending and descending registers as recorded by said data processing system;
   (b) determining a value difference between said registers of said postage meter and said recorded registers of said data processing system;
   (c) selecting a customer account to be rectified;
   (d) calculating a value amount by which said account will be rectified, said value amount based upon said value difference and any surcharge or discount corresponding to said account; and
   (e) posting said value amount to said selected customer account.

6. The method of claim 1, wherein said additional data and said customer data are modified wherein monetary value is moved either from a first account to a second account, or from said second account to said first account, said modification comprising the steps of:
   (a) determining an account to be modified;
   (b) determining a value amount by which said account will be modified;
   (c) determining if said determined value is to be added or subtracted from said account; and
   (d) moving said determined value from said first account to a second account if said determined value is to be subtracted from said first account, and moving said determined value from said second account to said first account if said determined value is to be added to said first account.

7. The method of claim 1, further comprising the steps of:
   (a) determining whether or not said transaction has been misapplied to said customer account, and if it is determined that said transaction has been misapplied, then;
   (b) identifying said misapplied transaction;
   (c) transferring said misapplied transaction to a second account;
   (d) calculating a value amount by which said data fields of said customer account will be changed, said value amount based upon any surcharge or discount corresponding to said customer account;
   (e) calculating a second value amount by which said data fields of said second account will be changed, said value amount based upon any surcharge or discount corresponding to said second account; and
   (f) automatically transferring said calculated value amount and said calculated second value amount to their respective accounts.

8. The method of claim 1, wherein entry of said customer data to said data processing system is done through a keyboard.

9. The method of claim 1, wherein said data fields, said entries, and said transaction values are viewed on one or more displays.

10. The method of claim 1, wherein said transaction and said account data are printed on a printer.

11. The method of claim 1, wherein said printed transaction is summarized by said data processing system and a copy of said summarized transaction is given to said customer as a receipt.

12. The method of claim 1, wherein said communication with said postage meter occurs in real time such that an ascending index of each mail piece being franked in said transaction is displayed on a first display or on a second display.

13. The method of claim 1, wherein said communication with said postage meter occurs in real time such that an ascending total of the value of each of said mail piece frankings in said transaction is displayed on a first display or on a second display.

14. The method of claim 1, wherein said data processing system is in passive communication with a plurality of postage meters, said passive communication allowing a single postage meter at a time to actively communicate with said data processing system; said data processing system maintaining a record of the ascending and descending registers for each of said postage meters in said plurality of postage meters.

15. The method of claim 1, wherein currency, coupons, or any of a plurality of vehicles representing value are placed in a containment means for securing said currency, coupons, or plurality of vehicles, said containment means capable of being opened by direction from said application program.

16. A method for franking, accounting, and billing of mail services, comprising the steps of:
   (a) enabling a data processing system to communicate with a postage meter;
   (b) initializing an application program on said data processing system, in which a customer account can be established and/or altered;
   (c) entering customer data into said application;
   (d) initiating a transaction by entering additional data and values into a data field of said application;
   (e) verifying that said ascending and descending registers match a record of said registers maintained within said data processing system, and if said registers do not match, then performing a rectification;
   (f) completing said transaction by totaling said values and, then, determining whether or not said transaction data or said transaction value is to be corrected;
   (g) correcting said transaction value by a modification if incorrect and recording said transaction in said data processing system's memory if said transaction value is correct;
   (h) recording said transaction value in said customer account in respect of a future billing; and
   (i) downloading said transaction data and said transaction value to a medium for use in preparing said future billing.

17. The method of claim 16, wherein said downloading is accomplished through the use of a modem that is operatively connected to said data processing system and said downloading is to another data processing system.

18. The method of claim 16, wherein said uploading is accomplished through the use of a modem that is operatively connected to said data processing system and said uploading is from another data processing system.

19. The method of claim 16, wherein said downloading is to a memory card or tape that may store data for uploading to another data processing system.

20. The method of claim 16, wherein said uploaded set of data or values is a list of rates or updates to previously uploaded rates.

21. The method of claim 16, wherein said uploaded set of data or values is additional postage value to be added to said postage meter for franking.

* * * * *